(12) United States Patent
Odoi et al.

(10) Patent No.: US 8,373,630 B2
(45) Date of Patent: Feb. 12, 2013

(54) DISPLAY DEVICE

(75) Inventors: Yuzo Odoi, Tokyo (JP); Yoichi Tomita, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 1171 days.

(21) Appl. No.: 12/240,260

(22) Filed: Sep. 29, 2008

(65) Prior Publication Data
US 2009/0085831 A1 Apr. 2, 2009

(30) Foreign Application Priority Data

Oct. 1, 2007 (JP) ................................ P2007-257268
Jul. 3, 2008 (JP) ................................ P2008-174347

(51) Int. Cl.
*G09G 3/36* (2006.01)
(52) U.S. Cl. ............................ 345/87; 345/84; 345/102
(58) Field of Classification Search .................... 345/1.1, 345/1.3, 55, 76, 82, 83, 84, 87, 102, 905; 361/600, 679.01, 679.02, 679.21, 679.26, 361/679.27
See application file for complete search history.

(56) References Cited

U.S. PATENT DOCUMENTS

| | | | | |
|---|---|---|---|---|
| 6,064,424 A | * | 5/2000 | van Berkel et al. | 348/51 |
| 6,437,974 B1 | * | 8/2002 | Liu | 361/679.27 |
| 6,801,243 B1 | * | 10/2004 | Van Berkel | 348/59 |
| 2002/0039229 A1 | | 4/2002 | Hirose et al. | |
| 2003/0012532 A1 | | 1/2003 | Prigent | |

FOREIGN PATENT DOCUMENTS

| | | |
|---|---|---|
| JP | 6-262964 | 9/1994 |
| JP | 10-260398 | 9/1998 |
| JP | 2000-231991 | 8/2000 |
| JP | 2000-250432 | 9/2000 |
| JP | 2002-104024 | 4/2002 |
| JP | 2002-358032 | 12/2002 |

* cited by examiner

*Primary Examiner* — My-Chau T Tran
(74) *Attorney, Agent, or Firm* — Oblon, Spivak, McClelland, Maier & Neustadt, L.L.P.

(57) ABSTRACT

A display device including a display element having a planar display face on which a plurality of pixels are arranged in a matrix shape and an optical element arranged in close contact with or in close proximity to at least a partial region of the planar display face and optically transmitting image light incoming from the planar display face to a light-emitting face, characterized in that the light-emitting face of the optical element has a surface not parallel to at least the planar display face and forms a nonplanar display face and that the plurality of pixels on the planar display face do not have the same dimensions but different dimensions in accordance with the angle θ formed by the planar display face and the nonplanar display face corresponding to the pixels of the planar display face.

12 Claims, 17 Drawing Sheets

$Py = Pyf = Pyg$ $QX = QXf = QXg$
$QY = QYf = QYg$

DISPLAY DEVICE

This application claims priority from Japanese Patent Application No. 2007-257268 filed on Oct. 1, 2007 and Japanese Patent Application No. 2008-174347 filed on Jul. 3, 2008, the entire subject matter of which is incorporated herein by reference.

BACKGROUND OF THE INVENTION

1. Field of the Invention

The present invention relates to a display device and in particular to a display device including a nonplanar display face on the side of an observer such as a recessed, protruding or curved face instead of a planar display face.

2. Description of the Related Art

In recent years, display devices have been used in a variety of devices as means for displaying information to an observer. Current representative display devices have employed, in their main sections, new display elements using a liquid crystal display, a plasma display, an Electroluminescence (EL) display, a Field Emission Display (FED) or the like instead of a cathode-ray tube as a mainstay in the related art. These new display elements employ a display face which is typically planar (flat) and which includes a plurality of pixels as a basic unit for forming an image arranged thereon in a matrix shape. The display elements may be provided in a reduced thickness. These new display elements are generally called flat panel displays.

The plurality of pixels arranged in a matrix shape on the planar display face of these new display elements have the same dimensions. This produces no distortions in an image on the display face and thus provides an excellent display quality unlike on the related art cathode-ray tube that forms an image through scanning by electronic beams.

In contrast, some display devices prefer a nonplanar display face such as a recessed, protruding or curved face rather than a planar display face from the viewpoint of design requirements.

Other display devices prefer a nonplanar display face such as a recessed, protruding or curved face in accordance with the direction of a plurality of observers expected, in order to provide distortion-free, visible images to respective observers watching the display face from different directions.

Display devices that must address such requirements include display devices for advertisement, display devices for ornaments, display devices for amusement, vehicle-mounted display devices, and display devices for aircraft.

JP-A-06-262964 (FIG. 1) discloses a display device of the projector type including an optical lens system projecting an image on a curved screen as a method for providing a display device including a nonplanar display face.

JP-A-10-260398 (FIG. 6) discloses a display device including a curved display face obtained by bending a liquid crystal element composed of a flexible substrate.

JP-A-2002-104024 (FIG. 3) discloses a method for inputting image data to be projected to a display element with the image data to be projected distorted by an image controller in a direction opposite to a curved screen in order to correct distortions in an image displayed on the curved screen and thus reducing the distortions in the image displayed on the curved screen.

JP-A-2002-358032 (FIG. 3) and JP-A-2000-250432 (FIGS. 5, 6, 7, 8, 10) disclose a display device including an optical element composed of an optical fiber plate arranged in front of a planar display element with the display face on the observer's side made into a curved shape instead of using a projector.

With the display device of the projector type disclosed in JP-A-06-262964, a three-dimensional appearance is given to an image displayed on the curved screen although the image is distorted. The projector system has problems such as a large depth (thickness) of the display device and the optical system vulnerable to vibrations. The image is blurred unless the curved screen is positioned at the focal point of the optical lens. Thus, the shape of the nonplanar screen is limited.

The display device disclosed in JP-A-10-260398 provides a curved display face by bending a flexible substrate constituting a liquid crystal display panel. This arrangement is simple but the material, thickness and heat resistance of the flexible substrate are limited. It is currently difficult to manufacture a liquid crystal display panel of the active matrix type made of a thin-film transistor or the like that offers high picture quality. The nonplanar display face has the shape of a simple curved face and the shapes of a nonplanar display face that may be manufactured are limited.

With the display device of the projector type disclosed in JP-A-2002-104024, image data is corrected by the image controller and is inputted to the display element and this arrangement is applicable to correction of distortions in an image presented on various types of nonplanar display devices. A plurality of pixels arranged in a matrix shape constituting the display face of a display element to which image data is to be inputted have the same dimensions and distortions in an image is corrected assuming a certain dimension of a pixel of the display element as the minimum unit. Depending on the shape of a particular nonplanar display face, uncorrectable distortions in an image are conspicuous.

With the display devices disclosed in JP-A-2002-358032 and JP-A-2000-250432, an image on the planar display element is enlarged or reduced or a nonplanar display face is provided in an simple way by using an optical element composed of an optical fiber plate. However, JP-A-2002-358032 and JP-A-2000-250432 do not refer to the problem of distortions in an image on a nonplanar display face or means to solve the problem.

SUMMARY OF THE INVENTION

The invention has been accomplished in order to solve the foregoing problems. An object of the invention is to provide a display device capable of configuring a nonplanar display face in a simple way on the side of an observer by using a planar display element and including a nonplanar display face capable of reducing distortions in an image when the observer watches the nonplanar display face from a predetermined direction.

The invention provides a display device comprising a display element having a planar display face on which a plurality of pixels are arranged in a matrix shape and an optical element arranged in close contact with or in close proximity to at least a partial region of the planar display face and optically transmitting image light incoming from the planar display face to a light-emitting face, characterized in that the light-emitting face of the optical element has a surface not parallel to at least the planar display face of the display element and forms at least part of a nonplanar display face on the side of an observer and that the plurality of pixels on the planar display face of the display element do not have the same dimensions but different dimensions in accordance with the angle formed by the planar display face and the nonplanar display face corresponding to the pixels of the planar display face.

According to the invention, it is possible to provide a display device including a nonplanar display face which readily presents a nonplanar display face to the observer through combination of a planar display element and an optical element and which are almost free from distortions in an image when the observer watches the nonplanar display face from a predetermined direction.

DETAILED DESCRIPTION OF THE PREFERRED EMBODIMENTS

Embodiments of a display device according to the invention will be described based on figures. In the figures illustrating the embodiments, the same sign represents the same or an equivalent part so that the duplicated description is omitted in general.

Embodiment 1

Figure 1:
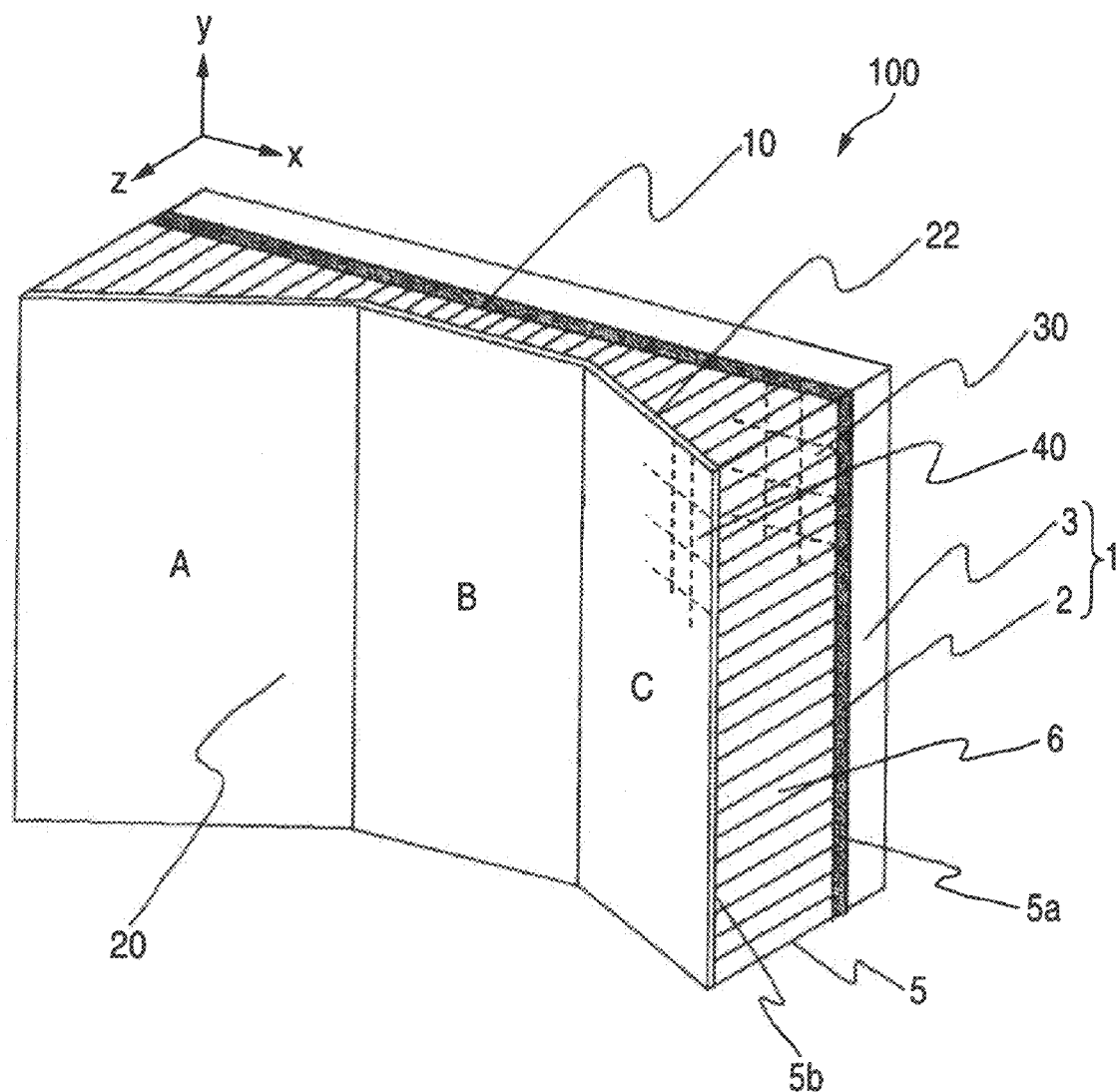
FIG. 1 is a perspective view of the general configuration of a display device according to Embodiment 1 of the invention.
Figure 2:
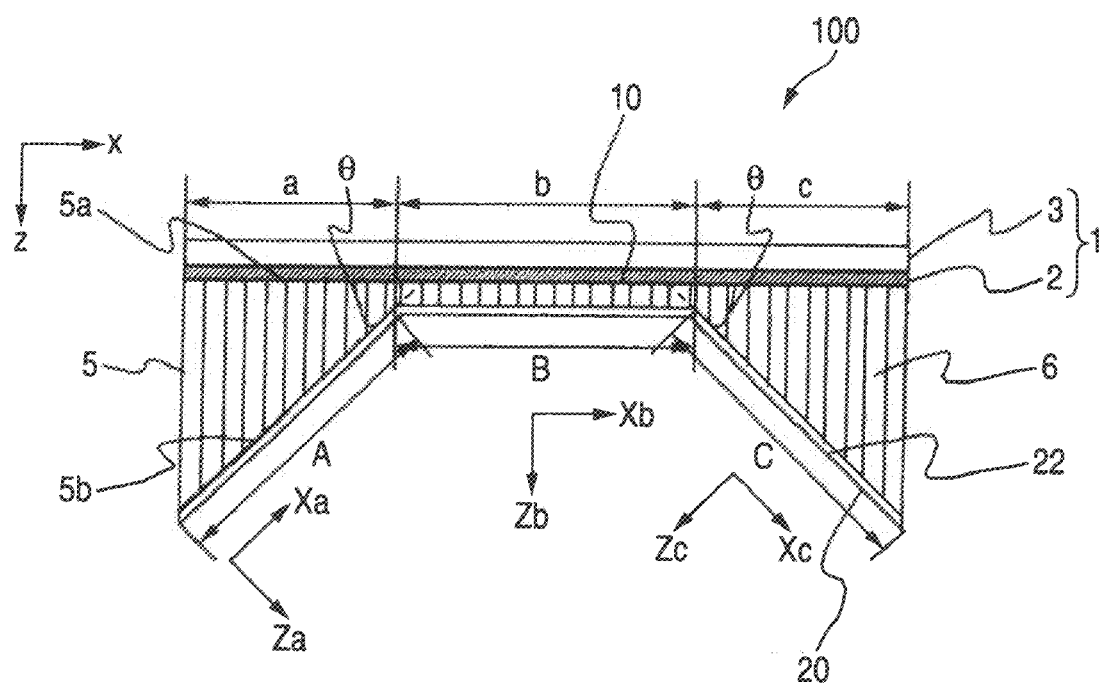
FIG. 2 is a top view of the liquid crystal display device according to Embodiment 1 of the invention.
Figure 3:
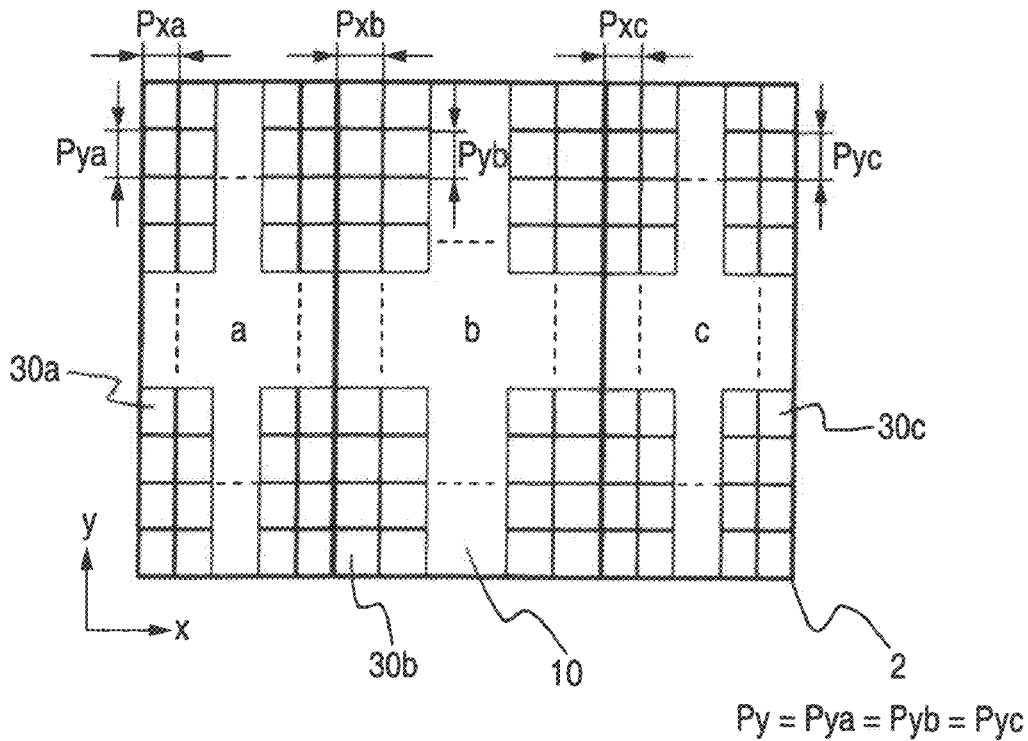
FIG. 3 is a front view showing a plurality of pixels arranged in a matrix shape constituting the nonplanar display face of the liquid crystal display device according to Embodiment 1 of the invention.
Figure 4:
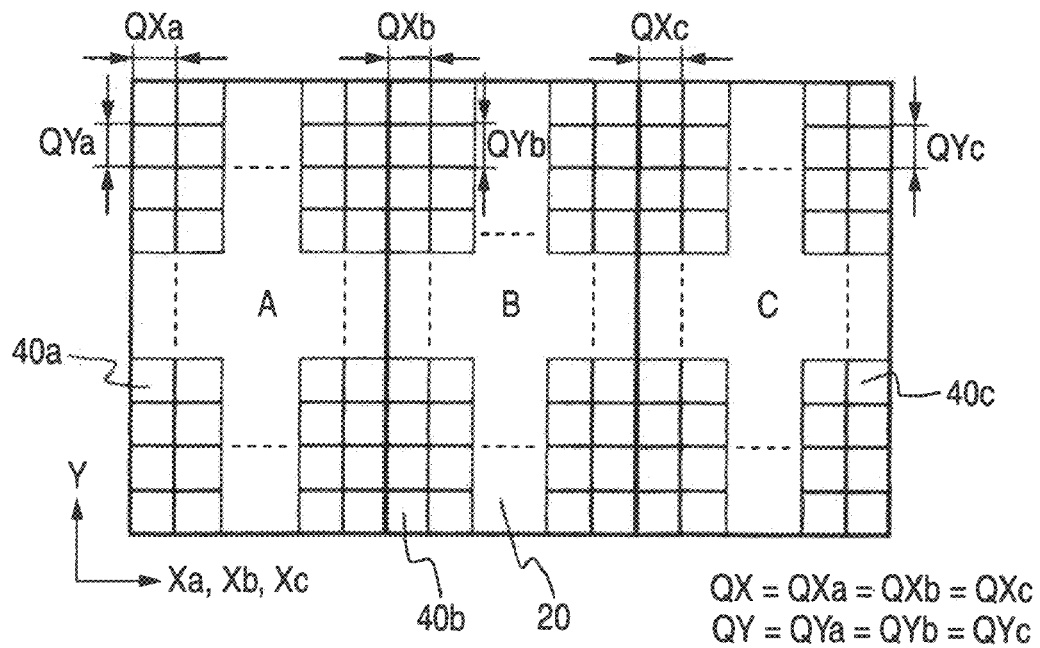
FIG. 4 is a front view showing the plurality of pixels arranged in a matrix shape with the nonplanar display face of the liquid crystal display device according to Embodiment 1 of the invention developed in horizontal direction.

FIG. 1 is a perspective view of the general configuration of a display device according to Embodiment 1 of the invention. FIG. 2 is a top view of the display device shown in FIG. 1. FIG. 3 is a front view showing a plurality of pixels arranged in a matrix shape constituting the planar display face of a display element in the display device of FIG. 1. FIG. 4 is a front view showing the plurality of pixels arranged in a matrix shape with the nonplanar display face of the display device of FIG. 1 developed in horizontal direction.

In FIGS. 1 and 2, a display device 100 comprises a display element 1 including a liquid crystal display panel 2 having a planar display face 10 and a backlight 3, and an optical element 5 arranged in close contact with or in close proximity to the front surface of the entire planar display face 10. The optical element 5 is an assembly of a large number of optical paths having dimensions smaller than those of a pixel 30 of the planar display face 10 and optically transmits image light incoming from the planar display face 10 toward the observer. While the light incident face 5a of the optical element 5 is planar, the light-emitting face 5b on the side of the observer has a nonplanar shape (recessed shape in this example) composed of three regions A, B, C. The light-emitting face 5b of the optical element 5 constitutes the entire nonplanar display face 20. A pixel 40 of the nonplanar display face 20 corresponding to a pixel 30 of the planar display face 10 serves as a basic unit of an image displayed on the nonplanar display face 20.

On the entire light-emitting face 5b of the optical element 5 constituting the nonplanar display face 20 is arranged in close contact a diffusing member 22 for diffusing outgoing light to expand a viewing angle composed of an optical sheet or the like. Note that the diffusing member 22 is not essential depending on the optical element 5.

It is possible to form a display device 100 including a nonplanar display face 20 with a simple configuration through combination of an optical element 5 including a nonplanar light-emitting face 5b and a display element 1 including a planar display face 10 without using a projector system where a nonplanar screen, an optical lens, a display element and a light source are isolated from each other as in the related art. It is also possible to reduce such problems with the projector system as vibrations, out-of-focus due to impact, and a large depth.

The display element 1 may use a plasma display, an EL display, or a FED as a self luminous type display. The self luminous type display element 1 does not require the backlight 3.

In Embodiment 1, for simplicity, the nonplanar display face 20 is composed of a combination of three regions A, B, C in simple planar shapes. The planar display face 10 and the nonplanar display face 20 have the same vertical direction y in all regions.

A region B in the center of the nonplanar display face 20 is a plane parallel to the region b of the planar display face 10 of the display element 1 that corresponds thereto via the optical element 5.

Regions A, C at both ends of the nonplanar display face 20 is not parallel to the regions a, c at both ends of the planar display face 10 of the display element 1 that correspond thereto via the optical element 5. The horizontal direction x of the regions a, c and the horizontal directions Xa, Xc of the regions A, C respectively form the same angle θ although they may form different angles.

For example, the regions A, C may be formed into curved shapes and the angle θ formed with respect to the planar display face 10 may be gradually changed with on the positions of the regions A, C. In this way, according to the invention, the shape of the nonplanar display face 20 on the observer's side may have a recessed shape, a protruding shape, a curved shape, or a combination thereof depending on the shape of the light-emitting face 5b of the optical element 5.

With the display device 100 according to Embodiment 1, three directions with respect to the nonplanar display face 20 are directions of observation where an image is almost free from distortions. To be more precise, the directions of normals Za, Zb, Zc to the regions A, B, C are directions of observation where an image is almost free from distortions. With a planar display device, the direction of a normal to the display face (front direction) is generally the sole direction of observation where an image is almost free from distortions. In this way, the display device 100 including the nonplanar display face 20 may have more than one direction of observation where an image is almost free from distortions depending on its configuration.

The direction of observation where an image is almost free from distortions refers to a direction where the original image shape of image data appears in the same shape (appears similar to) as an image displayed in a region of the display face when the region is viewed from a predetermined direction. That is, the displayed image appears almost distortion-free. Unless the apparent dimensions (dimensions in vertical and horizontal directions with respect to a predetermined direction of observation) of a plurality of pixels in a region of the display face are the same when the region is viewed from a predetermined direction, the image will include distortions.

The optical element 5 will be detailed below. The optical element 5 is capable of optically transmitting image light incoming from the display element 1 in a predetermined direction of progress. In case the image light from the display element 1 is almost perfect collimated light that does not diffuse in the direction of progress, a single transparent optical element 5 will suffice. Normally, the image light at the display element 1 is diffused light. When a diffusing member 22 is arranged, only a blurred image with reduced resolution is displayed on the nonplanar display face 20.

In Embodiment 1, the optical element 5 is an optical fiber plate as an assembly of small-diameter optical fibers 6 made of glass. For example, the fiber optic plate from Hamamatsu Photonics K.K. is available on the market. The optical fiber 6 has a diameter of 3 to 25 μm (6 μm in this example). For the direct vision type display device 100, the pixel 30 of the display element 1 has vertical and horizontal dimensions of 50 to 500 μm. Provided that the diameter of an optical fiber 6 as an optical transmission path is small enough compared with the dimensions of the pixel 30, it is possible to optically transmit the image light from the display element 1 to the light-emitting face 5b without reducing the resolution even in case the image light is diffused light. The optical fiber 6 may be made of plastic instead of glass.

Such an optical fiber plate including a nonplanar light-emitting face 5b of the optical element 5 may be manufactured by partially cutting a planar optical fiber plate at a predetermined angle. Or, such an optical fiber plate may be manufactured by bonding an optical fiber plate having the shape of a triangle pole whose light incidence face 5a and light-emitting face 5b form a predetermined angle to a planar optical fiber plate.

The optical element 5 composed of an optical fiber plate and the planar display face 10 of the display element 1 are desirably brought in close proximity to each other or in close contact with each other to minimize the gap therebetween. For example, in case the display element 1 is a liquid crystal display element, polarizing plates are affixed to the front and rear surfaces of the liquid crystal display panel 2 including the planar display face 10 (not shown). A glass substrate and a polarizing plate are arranged between the light incidence face 5a of the optical element 5 and the liquid crystal layer in the liquid crystal display panel 2, so that usually a gap of 0.5 to 1 mm exists therebetween. The backlight 3 usually emits diffused light. As the gap between the light incidence face 5a and the liquid crystal layer becomes larger, diffused light from a nearby pixel 30 is more likely to enter the optical fiber 6 just above the pixel 30, which reduces the resolution of an image on the light-emitting face 5b of the optical element 5 thus providing a blurred image. This drawback should be avoided. It is thus desirable to use as thin a glass substrate or a polarizing plate as possible, for example 0.05 to 0.2 mm thick, on the side of the optical element 5 of the liquid crystal display panel 2.

When the optical element 5 and the display element 1 are brought into close contact with each other, it is more desirable to bond the interface between the optical element 5 and the display element 1 with a material having an equivalent refractive index so as to eliminate an air space therebetween. This is to suppress possible reduction in the light use efficiency and optical interference caused by interface reflection attributable to different refractive indices in the presence of an air space between the optical element 5 and the display element 1.

In case the optical element 5 is composed of an optical fiber plate, a polarizing plate must be arranged between the liquid crystal display panel 2 and the light incidence face 5a of the optical element 5. In case a polarizing plate is arranged on the side of the light-emitting face 5b of the optical element 5, the direction of polarization of image light at the light-emitting face 5b optically transmitted while totally reflecting in the optical fiber 6 is not uniform even though the direction of polarization of image light from the liquid crystal display panel 2 at the light incidence face 5a of the optical element 5 is uniform. Thus, light leaks from the polarizing plate even when the display device 100 presents black display, which results in insufficient black display and a reduced contrast ratio.

In the regions A, B, C of the nonplanar display face 20 is arranged a diffusing member 22 for diffusing light in close contact with and along the shape of the light-emitting face 5b of the optical element 5. This is because, in case the optical element 5 is an optical fiber plate, the angle range of light that may impinge on or emit from the optical fiber 6 depends on a Numerical Aperture (NA) of the optical fiber 6. For example, as the NA becomes smaller, the angle range of light entering the light incidence face 5a of the optical fiber 6 may be made smaller so that unwanted light from a nearby pixel 30 is reduced and the angle range of light emitting from the light-emitting face 5b is also reduced. Thus, the diffusing member 22 is arranged on the light-emitting face 5b to expand the viewing angle.

Instead of arranging the diffusing member 22, the surface of the light-emitting face 5b of the optical element 5 may be processed into microscopic asperities or into a curved surface in order to provide light diffusion properties.

While not shown, it is desirable to form a reflection preventing layer on the uppermost surface of the nonplanar display face 20 in order to reduce reflection of extraneous light.

Next, the pixel 30 of the display element 1 will be detailed. In FIG. 3, the liquid crystal display panel 2 includes a planar display face 10 and is composed of three regions a, b, c corresponding to the nonplanar display face 20. Each region a, b, c includes a plurality of pixels 30a, 30b, 30c arranged therein in a matrix shape. The pixels 30a, 30b, 30c of the liquid crystal display panel 2 have an element structure composed of a thin-film transistor, gate wiring, source wiring, pixel electrodes, counter electrodes and a liquid crystal layer.

The dimensions Pxa, Pxb, Pxc of the pixels 30a, 30b, 30c in the regions a, b, c of the planar display face 10 in horizontal direction x are not identical. The dimensions Pxa, Pxc of the pixels 30a, 30c in the regions a, c differ from the dimension Pxb of the pixel 30b in the region b. The dimensions Pxa, Pxc of the pixels 30a, 30c in the regions a, c are identical (Pxa=Pxc). This is because the angle θ formed by the planar display face 10 and the nonplanar display face 20 is the same.

The dimensions Pya, Pyb, Pyc of the pixels 30a, 30b, 30c in the regions a, b, c of the planar display face 10 in vertical direction y all have the same value Py (Py=Pya=Pyb=Pyc).

For a pixel 40 of the nonplanar display face 20 on the observation side of the display device 100, each of the pixels 40a, 40b, 40c corresponding to the pixels 30a, 30b, 30c serves as a basic unit of an image in each region A, B, C of the nonplanar display face 20 corresponding to the regions a, b, c of the planar display face 10, as shown in FIG. 4.

The pixels 40a, 40b, 40c according to Embodiment 1 do not have a specific element structure unlike the pixels 30a, 30b, 30c of the liquid crystal display panel 2. What counts is that the pixels 40a, 40b, 40c each represent the apparent shape or dimensions of respective images as a basic unit of an image displayed in each of the regions A, B, C of the nonplanar display face 20 corresponding to the pixels 30a, 30b, 30c viewed from a predetermined direction of observation, in the directions of the normals Za, Zb, Zc in this example. That is, the dimensions of the pixels 40a, 40b, 40c described herein are apparent dimensions in vertical or horizontal direction perpendicular to a predetermined direction of observation in which an image is viewed. Unlike the dimensions of the pixels 30a, 30b, 30c, the dimensions of the pixels 40a, 40b, 40c change depending on the direction of observation. The dimensions do not match the length of an image along the curved face in the case of a curved nonplanar display face 20.

As shown in FIG. 4, while developed along the horizontal directions Xa, Xb, Xc in the regions A, B, C of the nonplanar display face 20, the dimensions QXa, QXb, QXc of the pixels 40a, 40b, 40c in the horizontal directions Xa, Xb, Xc have the same value QX (QX=QXa=QXb=QXc). The dimensions QYa, QYb, QYc of the pixels 40a, 40b, 40c in the vertical direction y have the same value QY (QY=QYa=QYb=QYc). QY is equal to the vertical dimension Py of the pixels 30a, 30b, 30c of the planar display face 10.

In this way, When each region A, B, C of the nonplanar display face 20 is viewed from the direction of each normal Za, Zb, Zc as a direction of observation where an image is almost free from distortions, the horizontal dimension QX of each pixel 40a, 40b, 40c is the same as the vertical dimension QY. In other words, each pixel 40a, 40b, 40c has a shape of a square with each side QX=QY. As a result, distortions in the image in each region A, B, C are removed.

Next, the working effect will be described concerning the fact that the dimensions of the pixel 30 constituting the planar display face 10 of the display element 1 depend on the angle formed by the planar display face 10 and the nonplanar display face 20 corresponding to the pixel 30.

Figure 5:
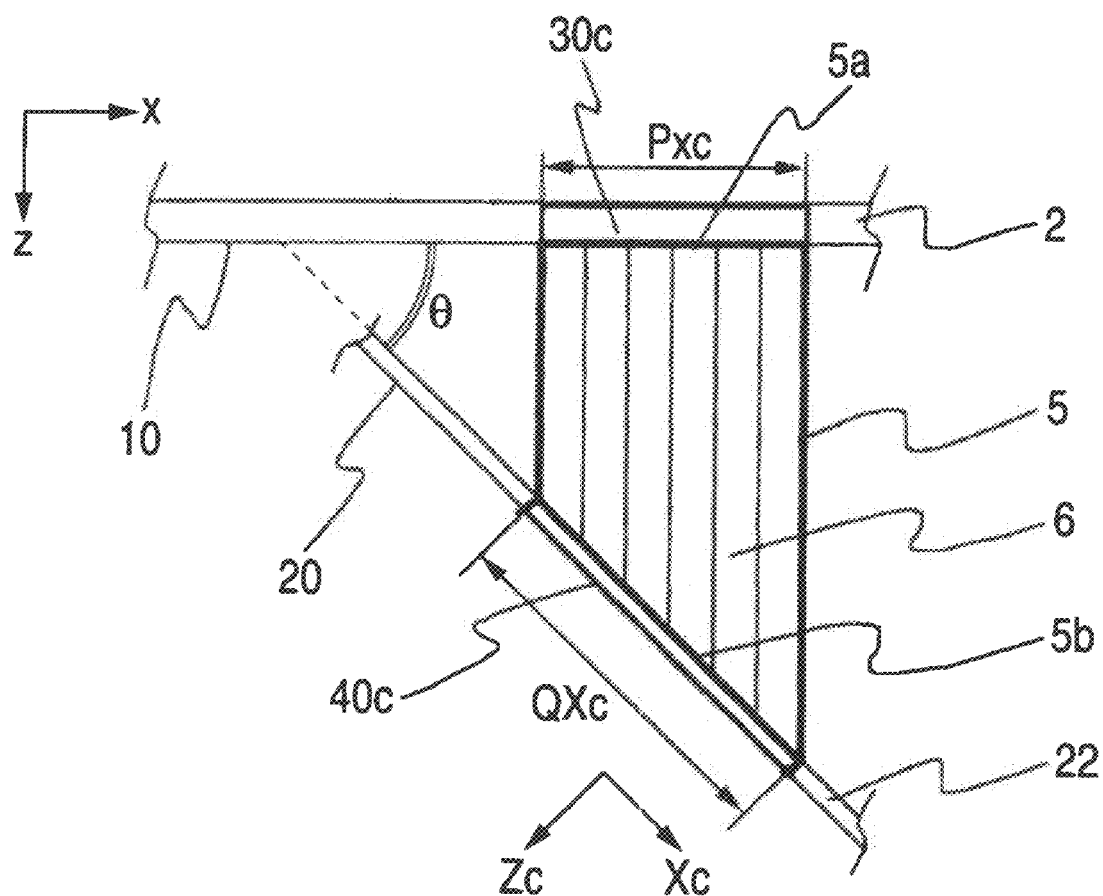
FIG. 5 is an expanded view of the region of one pixel in the regions C, c of the liquid crystal display device according to Embodiment 1 of the invention.

As shown in the top view of FIG. 5 showing the expanded view of the region of one pixel in the regions C, c of the display device 100, the optical fibers 6 constituting the optical element 5 are all arranged in the direction of a normal z to the planar display face 10.

With the optical element 5 thus configured, light from the pixel 30c of the planar display face 10 is optically transmitted in the direction of the normal z to the planar display face 10 while totally reflecting in each optical fiber 6. For example, in the relationship between the pixel 30c in the region c of the planar display face 10 and the corresponding pixel 40c in the region C of the nonplanar display face 20, assume that a direction of observation where an image is almost free from distortions is the direction of a normal Zc in the region C. Then the dimension Pxc of the pixel 30c in the horizontal direction x and the dimension QXc of the pixel 40c in the horizontal direction Xc depend on the angle θ formed by the pixel 30c in the region c and the pixel 40c in the region C. In this configuration, the relational expression $QXc=Pxc/\cos(\theta)$ holds.

Similarly, in the regions A, a of the display device 100, assuming that a direction of observation where an image is almost free from distortions is the direction of a normal Za in the region A, the relational expression $QXa=Pxa/\cos(\theta)$ holds.

In case the region B of the nonplanar display face 20 is parallel to the region b of the planar display face 10 as shown in FIG. 2, the angle θ formed therebetween is 0°. Assuming that a direction of observation in the region B where an image is almost free from distortions is the direction of a normal Zb, the dimension Pxb of the pixel 30b and the dimension QXb of the pixel 40B are identical (QXb=Pxb). An image in the region B is free from distortions.

Assume that the dimensions of the plural pixels 30a, 30b, 30c constituting the planar display face 10 are the same in all regions as with the related art display elements. When the regions A, C of the nonplanar display face 20 is viewed from each normal Za, Zc as a direction of observation where an image is almost free from distortions, the dimensions QXa, QXc of the pixels 40a, 40c are equal to the dimension QXb of the pixel 40b multiplied by $1/\cos(\theta)$.

Assume that the angle θ formed between the regions a, c of the planar display face 10 and the corresponding regions A, C of the nonplanar display face 20 is 45°. Since cos(45°) is approximately 0.7, the dimensions of an image in the region A, C of the nonplanar display face 20 in the horizontal direction Xa, Xc viewed by the observer from the direction of each normal Za, Zc are horizontally distorted 1.4 times the dimensions of the image in the horizontal direction Xb in the region B where an image is almost free from distortions.

The dimensions Pxa, Pxc of the pixels 30a, 30c in the regions a, c of the planar display face 10 may be designed to differ with on the angle θ formed between the regions a, c of the planar display face 10 and the regions A, C of the nonplanar display face 20. With this approach, it is possible to correct distortions in an image when the regions A, C of the nonplanar display face 20 are viewed from a predetermined direction of observation without correcting image data (coordinates in this example) to be inputted to the display element 1. While an image displayed in the regions a, c of the planar display face 10 of the display element 1 is distorted, an image in the regions A, C of the nonplanar display face 20 on the observer's side is almost free from distortions when viewed from the direction of each normal Za, Zc as a direction of observation where an image is almost free from distortions.

The angle θ=45° in this case, so that the dimensions Pxa, Pxc of the pixels 30a, 30c in the regions a, c of the planar display face 10 are approximately 0.7 times the dimension Pxb of the pixel 30b in the region b.

Figure 6:
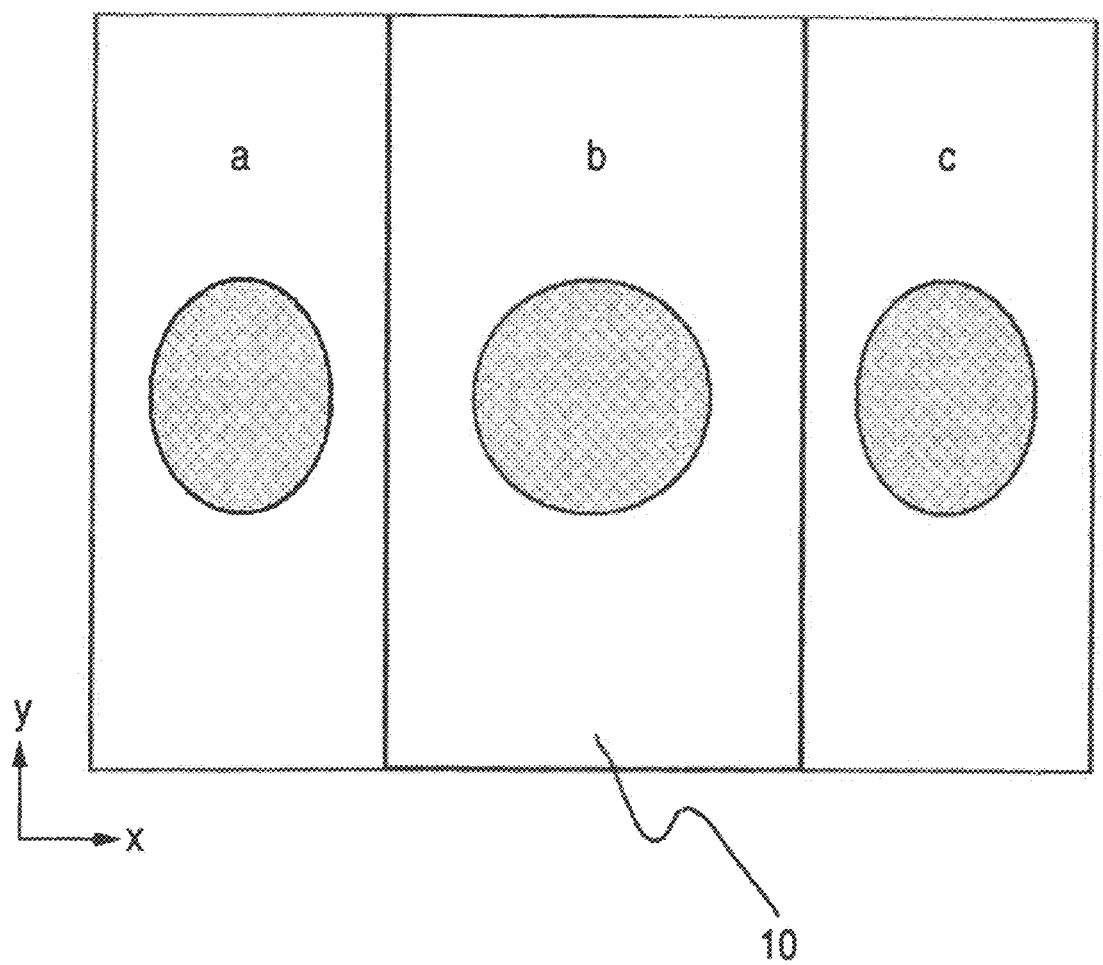
FIG. 6 shows an exemplary circular image displayed on the planar display face of the display element of the liquid crystal display device according to Embodiment 1 of the invention.
Figure 7:
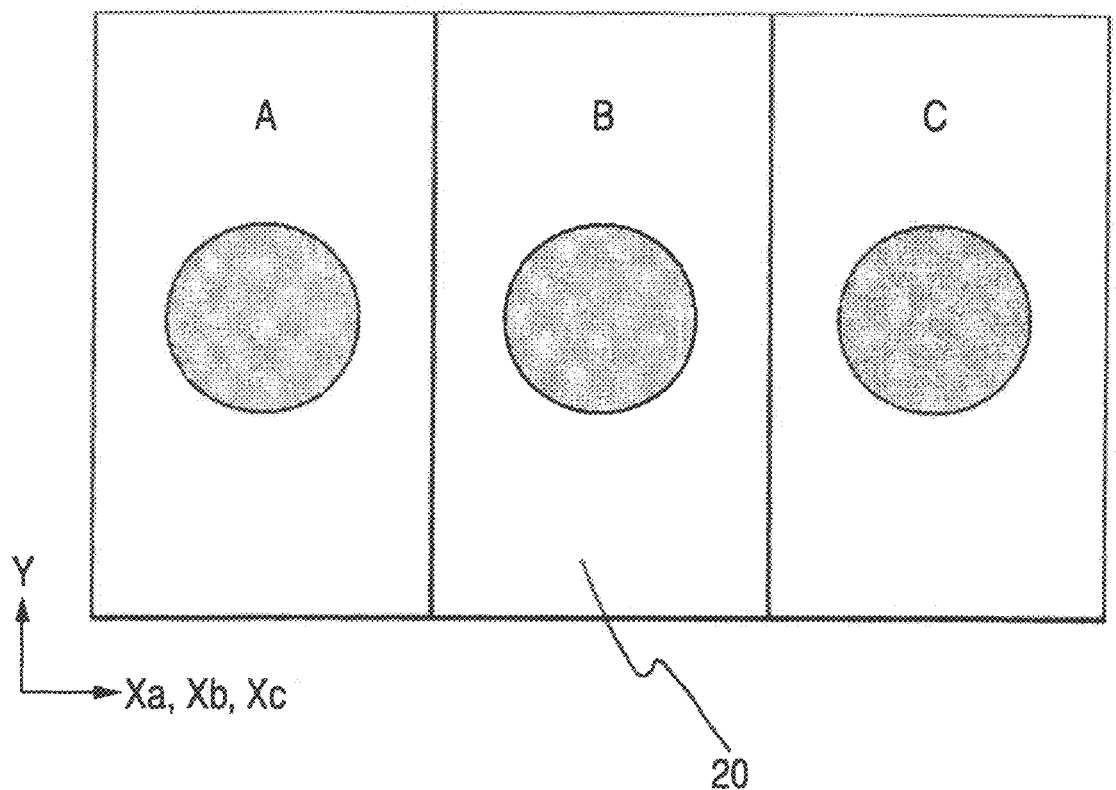
FIG. 7 shows an exemplary circular image displayed with the nonplanar display face of the liquid crystal display device according to Embodiment 1 of the invention developed in horizontal direction.

An example of a specific image is shown in FIGS. 6 and 7 where circles having the same dimensions are respectively displayed in the regions A, B, C of the nonplanar display face 20. Image data inputted to the display device 1 represents the coordinates of a circle having the same dimension. As shown in FIG. 6, the image displayed on the display face 10 of the display element 1 appears as a vertically long ellipse since the dimensions Pxa, Pxc of the pixels 30a, 30c in the regions a, c of the planar display face 10 are approximately 0.7 times the dimension Pxb of the pixel 30b in the region b. On the nonplanar display face 20 on the observer's side, with the optical element interposed, as shown in FIG. 7, the dimensions Qxa, QXc of the pixels 40a, 40c appears approximately 1.4 times larger when the regions A, B, C are viewed from the direction of each normal Za, Zb, Zc. The images of circles having the same dimensions almost free from distortions appear in the three regions.

As described above, the nonplanar display face 20 is composed of three regions A, B, C in Embodiment 1. The observer watches images almost free from distortions in the regions A, B, C of the nonplanar display face 20 from the direction of each normal Za, Zb, Zc where an image is almost free from distortions.

The display device 100 according to Embodiment 1 including a nonplanar display face 20 composed of three regions and having three directions of observation where images are almost free from distortions is preferable to, for example, a vehicle-mounted display device that poses limitations on the position of an observer, with a plurality of observers positioned in the driver's seat, front passenger seat, and rear passenger seat of an automobile.

Embodiment 2

Figure 8:
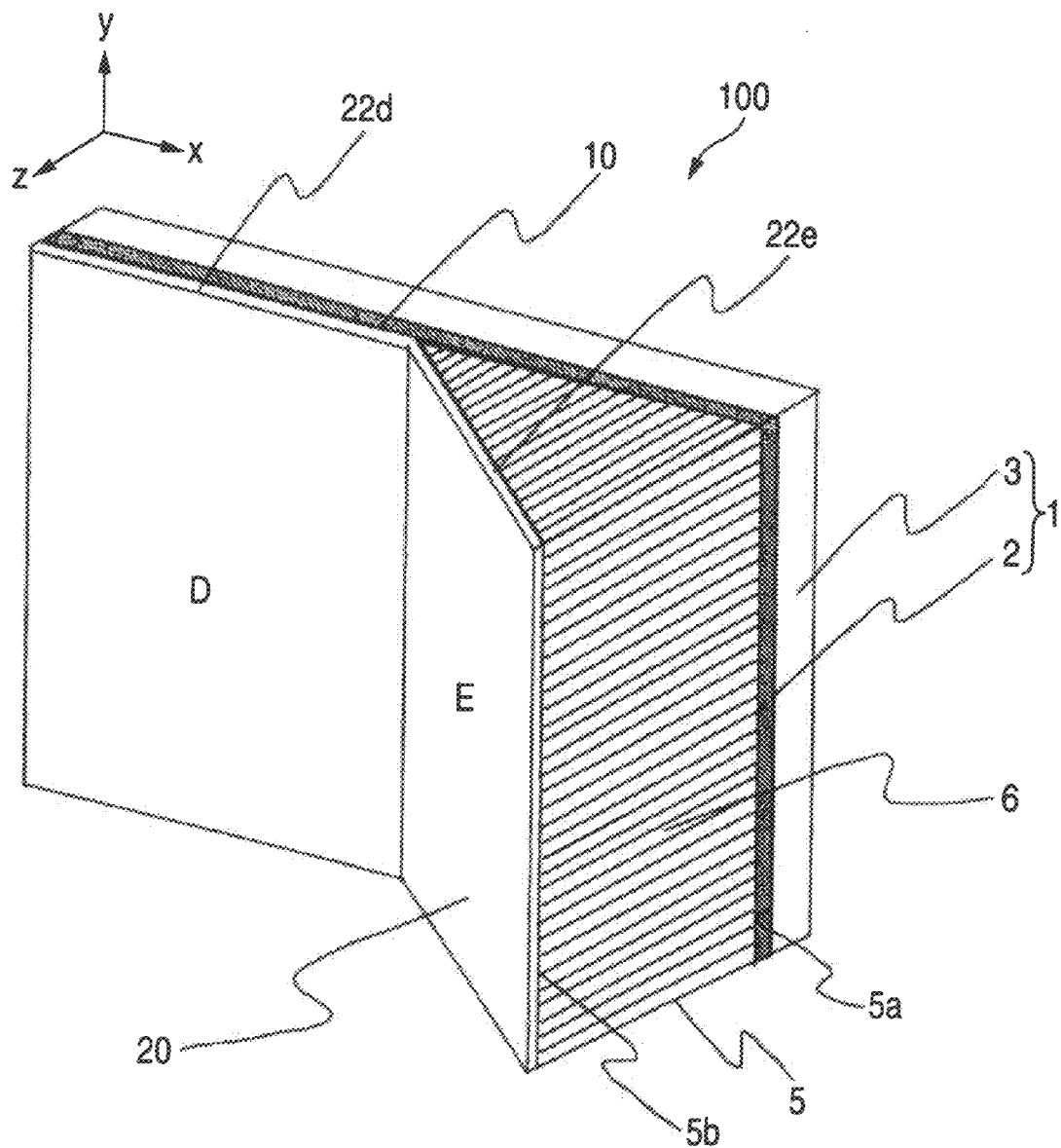
FIG. 8 is a perspective view of the general configuration of a display device according to Embodiment 2 of the invention.
Figure 9:
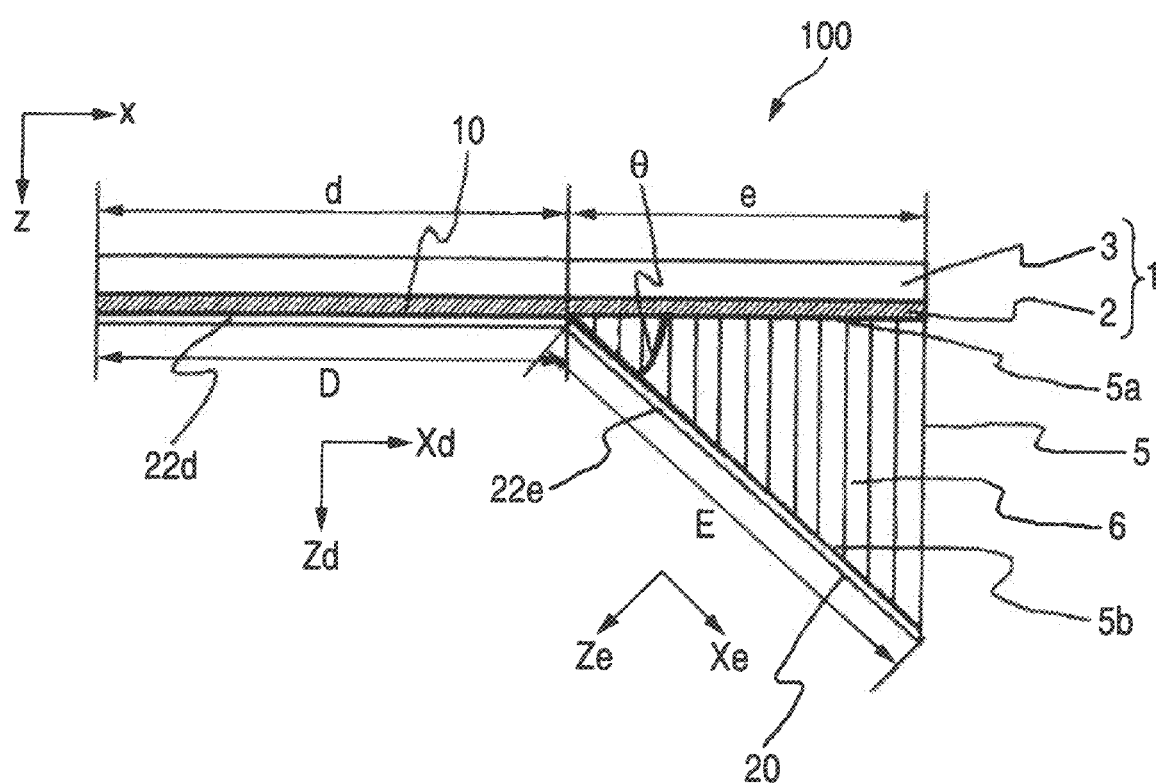
FIG. 9 is a top view of the liquid crystal display device according to Embodiment 2 of the invention.
Figure 10:
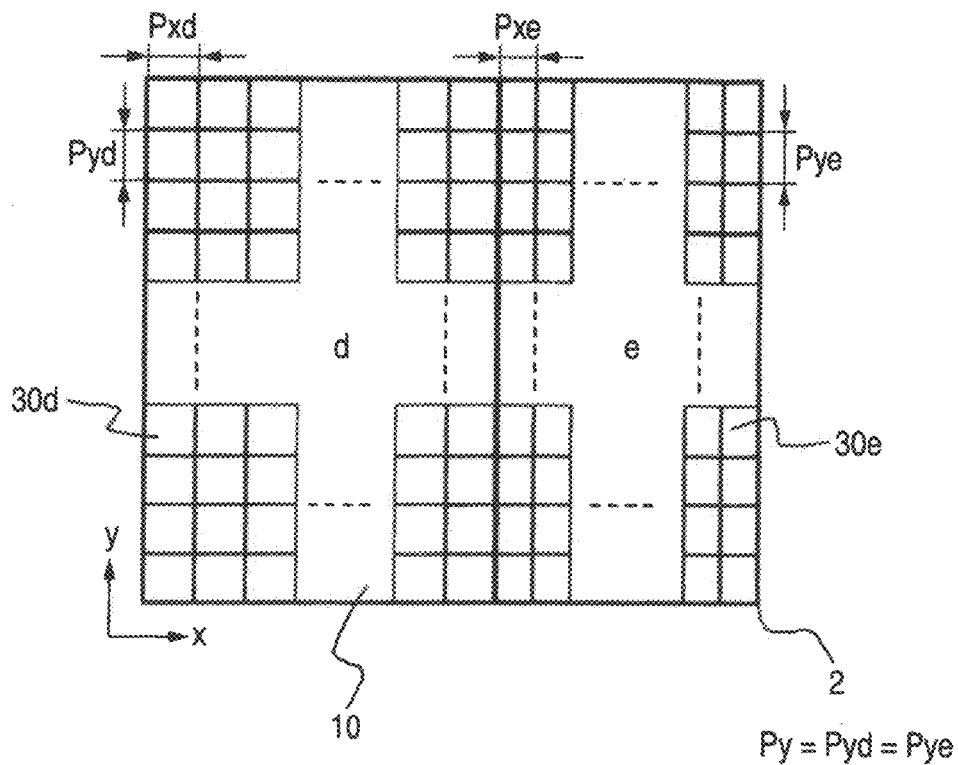
FIG. 10 is a front view showing a plurality of pixels arranged in a matrix shape constituting the nonplanar display face of the liquid crystal display device according to Embodiment 2 of the invention.
Figure 11:
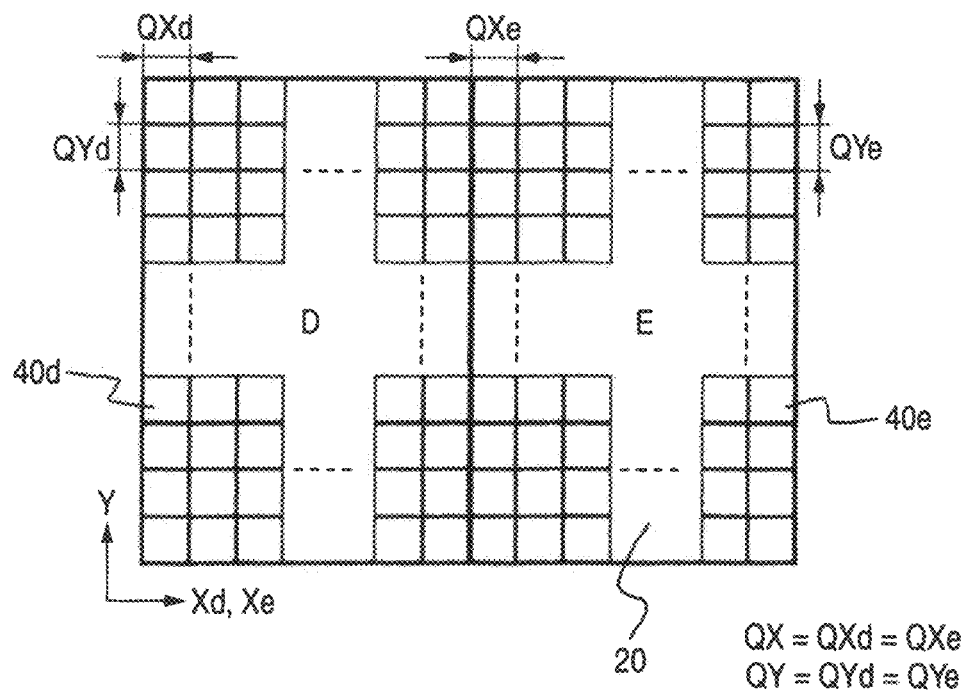
FIG. 11 is a front view showing the plurality of pixels arranged in a matrix shape with the nonplanar display face of the liquid crystal display device according to Embodiment 2 of the invention developed in horizontal direction.

FIG. 8 is a perspective view of the general configuration of a display device according to Embodiment 2 of the invention. FIG. 9 is a top view of the display device shown in FIG. 8. FIG. 10 is a front view showing a plurality of pixels arranged in a matrix shape constituting the planar display face of a display element in the display device of FIG. 8. FIG. 11 is a front view showing the plurality of pixels arranged in a matrix shape with the nonplanar display face of the display device of FIG. 8 developed in horizontal direction.

While the optical element 5 is arranged on the entire planar display face 10 of the display element 1 in Embodiment 1, the optical element 5 formed of an optical fiber plate is arranged in a partial region of the planar display face 10 as shown in FIG. 8 in Embodiment 2.

As shown in FIG. 9, the optical element 5 is arranged in a right-hand region e of the planar display face 10, not in a left-hand region d of the planar display face 10. The nonplanar display face 20 including two regions D, E is composed of a combination of the region d of the planar display face 10 of the display element 1 and the light-emitting face 5b of the optical element 5 forming an angle θ with the region e of the planar display face 10.

Diffusing members 22d, 22e are arranged in the regions D, E of the nonplanar display face 20. The region D does not include the optical element 5 so that the diffusing power is made different between the diffusing members 22d, 22e so as to provide an almost equal viewing angle in the regions D and E. In order to provide an equal viewing angle, the diffusing power may be made different between the diffusing members 22d, 22e depending on the regions D, E of the nonplanar display face 20. Either one or both of the diffusing members 22d, 22e may be omitted depending on the optical element 5.

As shown in FIG. 10, concerning a plurality of pixels 30d, 30e arranged in a matrix shape constituting the planar display face 10, the dimension Pxd of the pixel 30d in the horizontal direction x in the region d where the optical element 5 is not arranged differs from the dimension Pxe of the pixel 30e in the horizontal direction x in the region e where the optical element 5 is arranged at the front. The dimensions Pyd, Pye of the region d, e in the vertical direction y have the same value Py (Py=Pyd=Pye).

For the nonplanar display face 20 on the observation side, each of the pixels 40d, 40e corresponding to the pixels 30d, 30e serves as a basic unit of an image in each of the regions D, E of the nonplanar display face 20 corresponding to the regions d, e of the planar display face 10, as shown in FIG. 11. Assuming that a direction of observation where an image is almost free from distortions is the direction of a normal Zd, the pixel 40d in the region D of the nonplanar display face 20 has the same dimensions as the pixel 30d of the liquid crystal display panel 2. In case the diffusing member 22d is not used, the pixel 40d also has the element structure of the pixel 30d. The pixel 40e represents the apparent shape or dimensions as a basic unit of an image displayed in the region E of the nonplanar display face 20 corresponding to the pixel 30e viewed from the normal Ze as a direction where an image is almost free from distortions.

While developed along the horizontal directions Xd, Xe in the regions D, E of the nonplanar display face 20, the dimensions QXd, QXe of the pixels 40d, 40e, in the horizontal directions Xd, Xe have the same value QX (QX=QXd=QXe). The dimensions QYd, QYe of the pixels 40d, 40e in the vertical direction y have the same value QY (QY=QYd=QYe). QY is equal to the vertical dimension Py of the pixels 30d, 30e of the planar display region 10.

The optical element 5, same as FIG. 5 illustrating Embodiment 1, has a configuration where all optical fibers 6 are arranged in the direction of a normal z on the planar display face 10. In Embodiment 2 also, assuming that a direction where an image is almost free from distortions is the direction of a normal Ze in the region E, the relational expression QXe=Pxe/cos(θ) holds between the pixel 30e and the pixel 40e.

According to Embodiment 2, there are two directions where an image is almost free from distortions with respect to the nonplanar display face 20. That is, the directions of the normals Zd, Ze are directions where an image is almost free from distortions for the regions D, E. Same as Embodiment 1, this configuration is preferable to a vehicle-mounted display device where the positions of a plurality of observers are limited to the driver's seat and the front passenger seat.

In case a partial region D of the nonplanar display face 20 is planar as in Embodiment 2, the optical element 5 is not arranged in the corresponding region d of the planar display face 10 of the display element 1 and the region d may be used as a region D of the nonplanar display face 20. This reduces the size of the optical element 5 as well as the weight and costs of the display device 100.

While not shown, in Embodiment 2 also, it is desirable to form a reflection preventing layer on the uppermost surface of the nonplanar display face 20 in order to reduce reflection of extraneous light.

Embodiment 3

Figure 12:
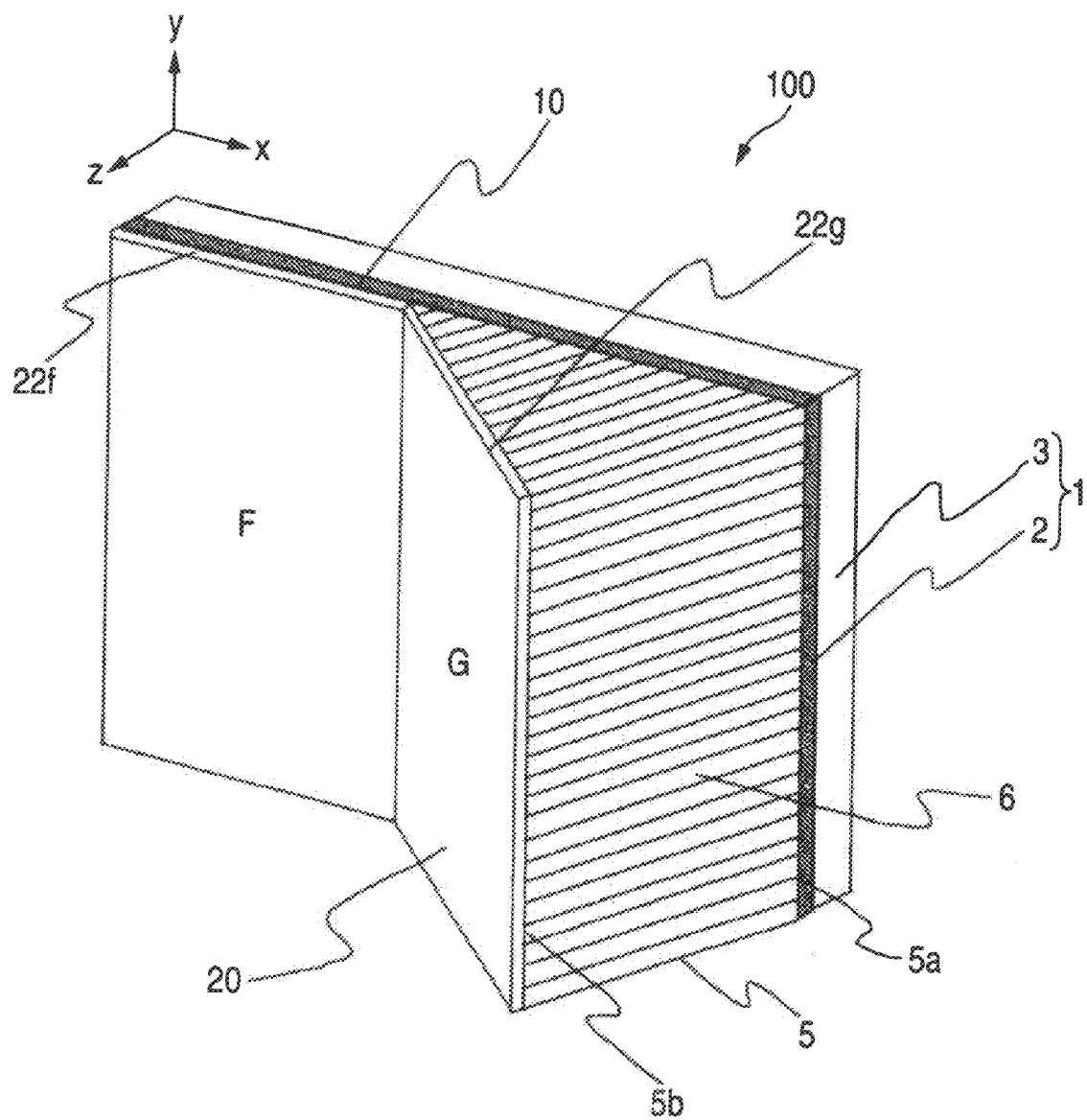
FIG. 12 is a perspective view of the general configuration of a display device according to Embodiment 3 of the invention.
Figure 13:
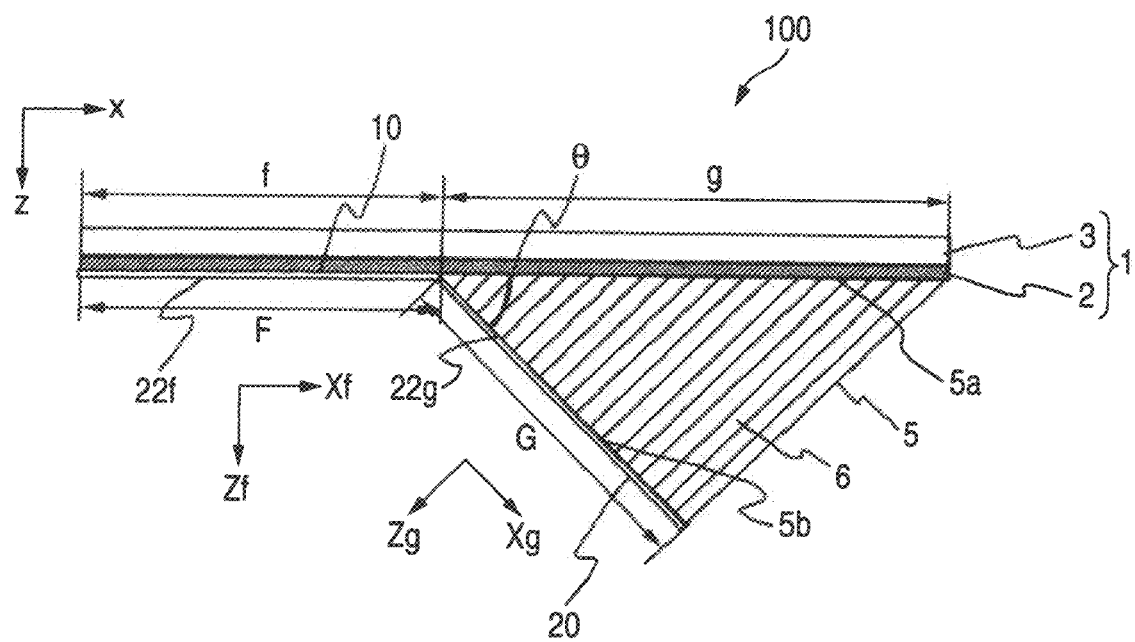
FIG. 13 is a top view of the liquid crystal display device according to Embodiment 3 of the invention.
Figure 14:
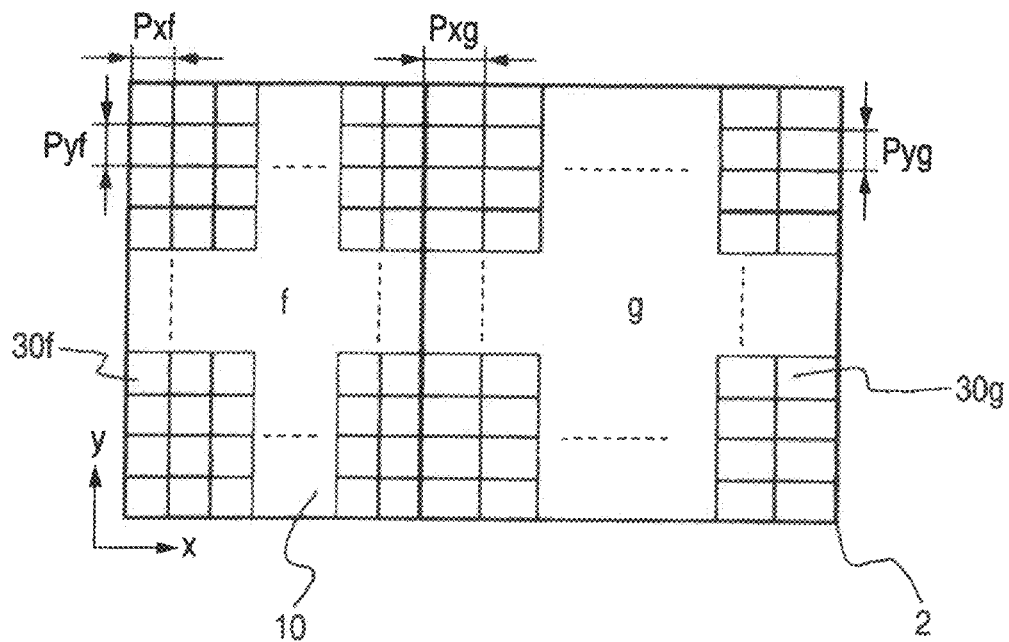
FIG. 14 is a front view showing a plurality of pixels arranged in a matrix shape constituting the nonplanar display face of the liquid crystal display device according to Embodiment 3 of the invention.
Figure 15:
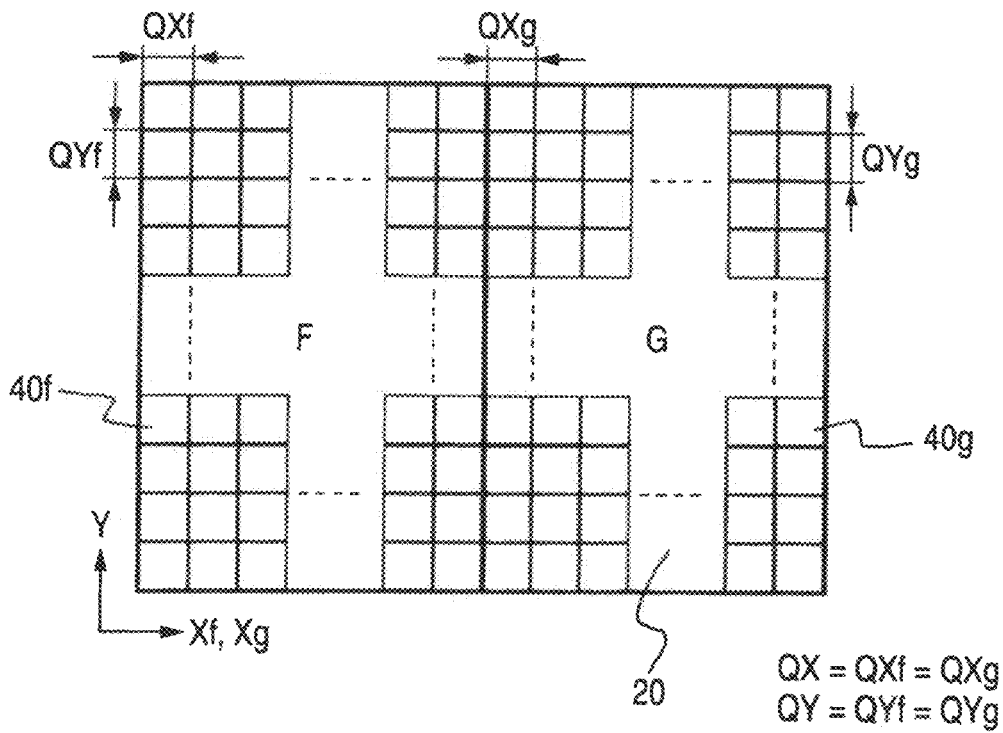
FIG. 15 is a front view showing the plurality of pixels arranged in a matrix shape with the nonplanar display face of the liquid crystal display device according to Embodiment 3 of the invention developed in horizontal direction.

FIG. 12 is a perspective view of the general configuration of a display device according to Embodiment 3 of the invention. FIG. 13 is a top view of the display device shown in FIG. 12. FIG. 14 is a front view showing a plurality of pixels arranged in a matrix shape constituting the planar display face of a display element in the display device of FIG. 12. FIG. 15 is a front view showing the plurality of pixels arranged in a matrix shape with the nonplanar display face of the display device of FIG. 12 developed in horizontal direction.

In Embodiment 3, the shape of the nonplanar display face 20 is the same as that of Embodiment 2. Embodiment 3 differs from Embodiment 2 in that the optical fibers 6 of the optical element 5 are arranged in the direction of the normal Zg in the region G of the nonplanar display face 20 rather than in the direction of normal in the region g of the planar display face 10, as shown in FIG. 13.

Also in such a configuration of the optical element 5, as shown in FIG. 14, the dimension Pxf of the pixel 30f in the horizontal direction x in the region f where the optical element 5 is not arranged differs from the dimension Pxg of the pixel 30g in the horizontal direction x in the region g where the optical element 5 is arranged. In FIG. 10 illustrating Embodiment 2, Pxd>Pxe, that is, the pixel 30e in the region e where the optical element 5 is arranged has a smaller dimension. In Embodiment 3, Pxf<Pxg, that is, the pixel 30g in the region g where the optical element 5 is arranged has a larger dimension. Note that the dimensions Pyf, Pyg of the region f, g in the vertical direction y have the same value Py (Py=Pyf=Pyg). This dimension is the same as that in Embodiment 2.

As shown in FIG. 15, the dimensions QXf, QXg of the pixels 40f, 40g in the regions F, G of the nonplanar display face 20 in the horizontal directions Xf, Xg have the same value QX (QX=QXf=QXg). The dimensions QYf, QYg of the pixels 40f, 40g in the vertical direction Y have the same value QY (QY=QYf=QYg). These dimensions are the same as those in Embodiment 2 shown in FIG. 11.

As in Embodiment 3, in case the optical fibers 6 are arranged in the direction of the normal Zg in the region G of the nonplanar display face 20, assuming that a direction of observation where an image is almost free from distortions is the direction of the normal Zg, the relational expression QXg=Pxg·cos(θ) holds between the pixel 30g in the region g and the pixel 40g in the region G. This relational expression is different from that in Embodiment 2.

In Embodiment 3 also, the dimensions of the pixel 30 of the planar display face 10 depend on the angle formed by the planar display face 10 and the nonplanar display face 20. Even though the direction of observation where an image is almost free from distortions is the same as that in Embodiment 2, the size of the change in the dimensions of the pixel 30 depend on the direction of the optical transmission path of the optical element 5.

Although Embodiment 3 is disadvantageous in that the size of the planar display face 10 or optical element 5 of the display element 1 is larger than that in Embodiment 2, the area of the corresponding pixel 40g in the region G (QXg·QY) is smaller than the area of the pixel 30g in the region g of the planar display face 10 (Pxg·Py) when viewed from the direction of the normal Zg. Assuming that the optical losses due to the optical element 5 are equivalent compared with the luminance of the region E in Embodiment 2 even when the image data has the same gradation, it is possible to set higher luminance to the region G. This configuration is effective for a case where high luminance is required in a partial region of the nonplanar display face 20.

Embodiment 4

Figure 16:
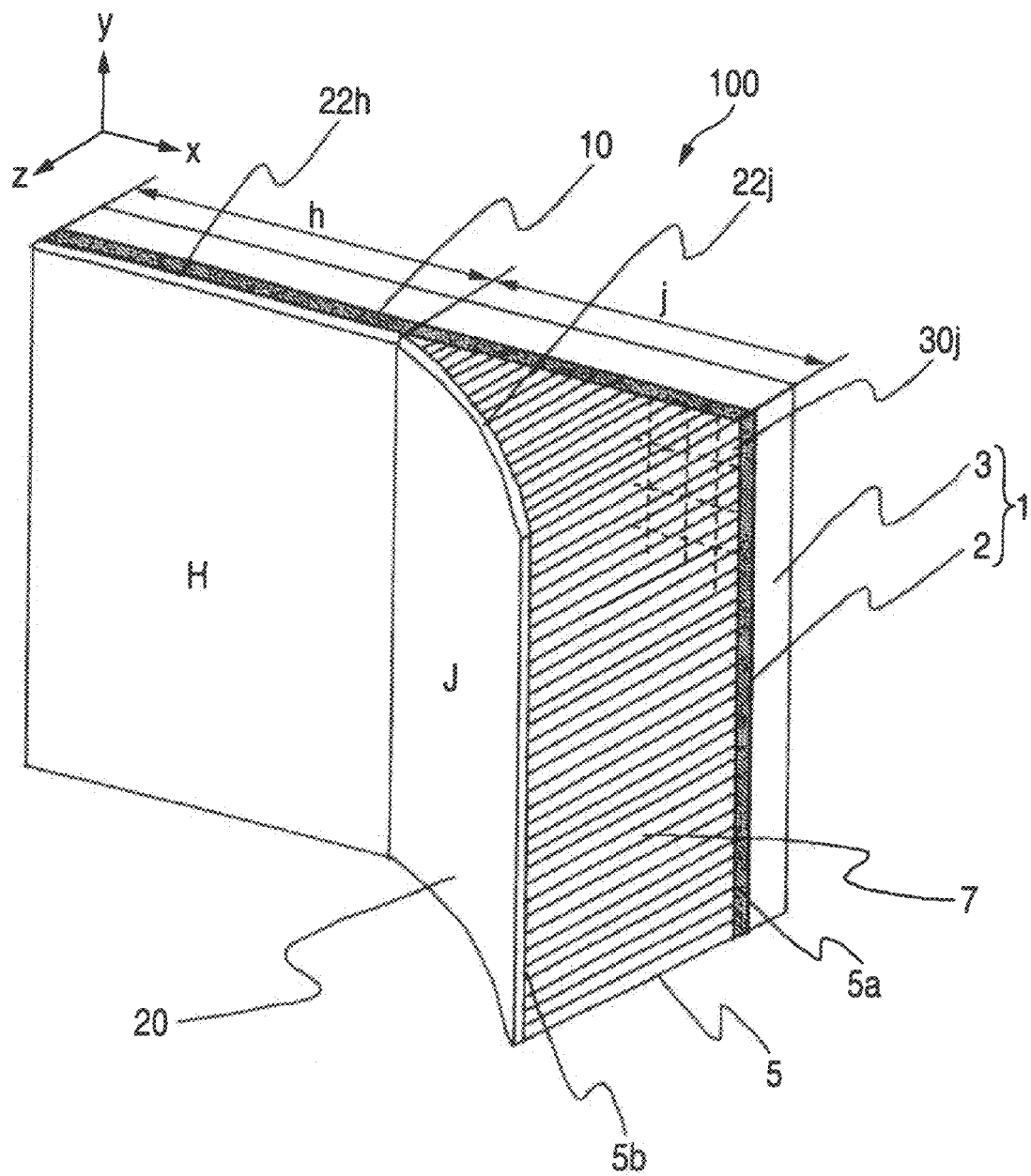
FIG. 16 is a perspective view of the general configuration of a display device according to Embodiment 4 of the invention.

FIG. 16 is a perspective view of the general configuration of a display device according to Embodiment 4 of the invention. While Embodiments 1 to 3 use, as an optical element 5, an optical fiber plate that is an assembly of optical fibers 6, Embodiment 4 uses, as an optical element 5, a capillary plate (for example from Hamamatsu Photonics K.K.) that is an assembly of capillaries 7 including microscopic cavities (in the shape of a circle or a polygon) smaller than the dimensions of the pixel 30j of the planar display face 10. The basic configuration of the display device 100 is almost equivalent to that in Embodiment 2 except that the capillary plate is used instead of the optical element 5. The nonplanar display face 20 includes diffusing members 22h, 22j in its regions H, J.

In Embodiment 4, the region J as part of the nonplanar display face 20 has a curved surface. In this case also, the dimensions of the pixel 30j in the region j of the planar display face 10 may be set differently from those in the region h so as to reduce distortions in an image when the region J having a curved surface is viewed from a predetermined direction of observation. In case the region J has a curved surface, the dimensions of the pixel 30j that depend on a predetermined direction of observation or direction of the optical path of the optical element 5 are not constant but gradually change in the region j also.

Next, the capillary plate will be described. A wall partitioning capillaries 7 is made of an opaque light-absorbing body or light-reflecting body and is capable of optically transmitting image light to the light-emitting face 5b at the resolution of the pitch of the capillary 7 in the absence of light coming from an adjacent capillary 7. In case the wall partitioning capillaries 7 is a black light-absorbing body, the angle range of light that emits from the capillary plate depends on the shape ratio of the cavity diameter of the capillary 7 to its length. As a result, the viewing angle of the region J on the light-emitting face 5b of the optical element 5 lies in a very narrow angle range around the direction of the capillary 7. To expand the viewing angle, a diffusing member 22j must be arranged on the light-emitting face 5b of the optical element 5. In case the cavity diameter of each capillary 7 is the same, the emission light quantity or emission angle range is reduced as the capillary 7 becomes longer. Thus, it is preferable to change the diffusion power of the diffusing member 22j also in the region J depending on the length of a capillary 7 of the optical element 5 in order to make uniform the luminance or viewing angle in the region J.

In Embodiment 4, the optical element 5 is a capillary plate as an assembly of capillaries 7 unlike Embodiments 1 to 3. The capillary plate is more lightweight than the optical fiber plate as an assembly of optical fibers 6.

Figure 17:
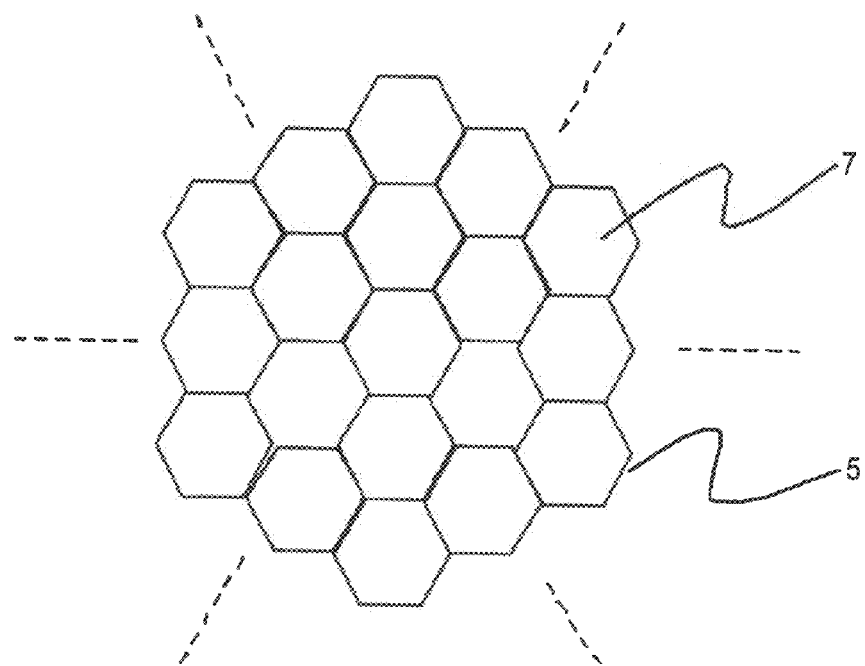
FIG. 17 is a plan view of the capillary plate of the display device according to Embodiment 4 of the invention.

As shown in the plan view of FIG. 17 as an enlarged view of the capillary 7 of the capillary plate, a cavity in the shape of a honeycomb lattice provides for a more uniform, reduced thickness of a wall between the capillary 7 and an adjacent capillary 7 than the circular shape. It is thus possible to increase the area ratio of the cavity that transmits light. While the dimensions of the honeycomb lattice differ, a capillary plate may be formed by using a technique to manufacture a corrugated cardboard or a lightweight structure plate made of Al or carbon polymer that has a similar structure to obtain a lightweight and rigid optical element 5.

Embodiment 5

In Embodiments 1 to 4, the dimensions of the pixel 30 of the display device 10 of the display element 1 differ with the angle θ formed by the planar display face 10 and the corresponding nonplanar display face 20. The area of the pixel 30 of the planar display face 10 differs with a region. As a result, when each region of the nonplanar display face 20 is viewed from a direction of observation where each image is almost free from distortions, the dimensions of a pixel 40 in each region is almost the same and the displayed image is almost free from distortions. However, the luminance in each region of the nonplanar display face 20 differs with the ratio of the area of the pixel 30 to the area of the corresponding pixel 40 viewed from a direction of observation, even when image data to be inputted to the display element 1 has the same gradation. This is partially described in Embodiment 3.

In each region of the nonplanar display face 20, the gradation of the original image data is converted to another gradation to obtain corrected gradation data before the image data is inputted to the display element 1 in accordance with the ratio of the area of the pixel 30 of the planar display face 10 to the area of the corresponding pixel 40 of the nonplanar display face 20 viewed from a direction of observation so as to obtain almost the same luminance as long as image data has the same gradation. With this approach, it is possible to display image data of the same gradation in each region of the nonplanar display face 20 at almost the same luminance from each direction of observation.

For example, in the case of the configuration shown in FIG. 13 according to Embodiment 3, assume that the angle θ formed by the region g of the planar display face 10 and the region G of the nonplanar display face 20 is equal to 45° (θ=45°) and the direction where the optical fibers 6 are arranged is the direction of the normal Zg. The area of the pixel 40g corresponding to the pixel 30g is approximately 0.7 times that of the pixel 30g assuming that a direction of observation where an image is almost free from distortions is the direction of the normal Zg. Provided the optical losses due to the optical element 5 are negligible, the luminance of the pixel 40g in the direction of the normal Zg rises to approximately 1.4 times that of the pixel 30g.

Figure 18:
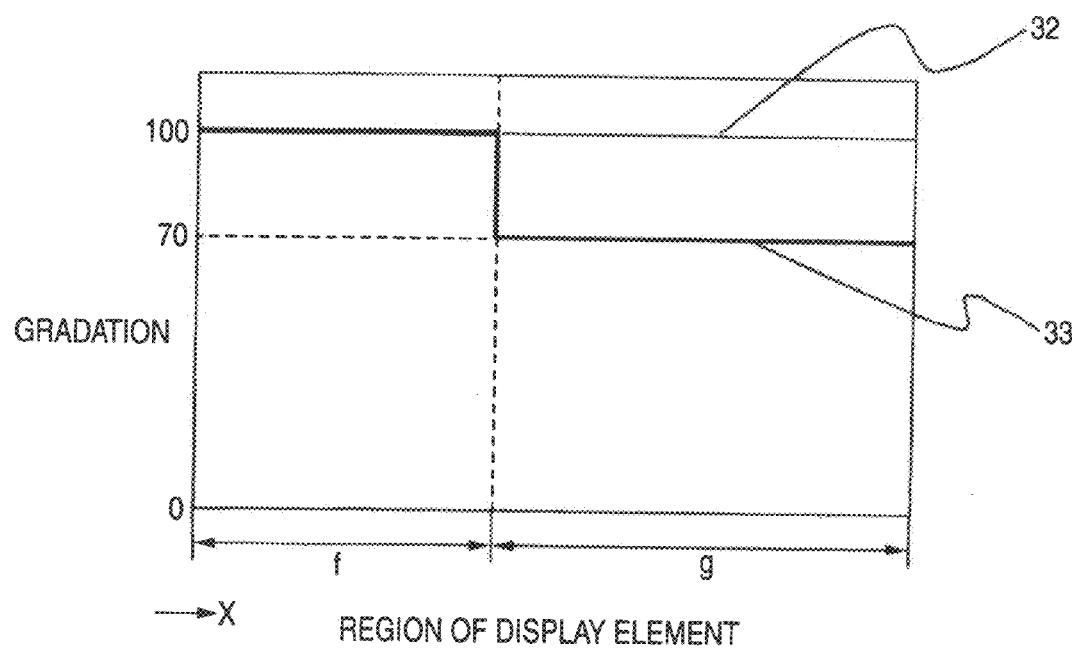
FIG. 18 shows the region of the display element of the liquid crystal display device according to Embodiment 5 of the invention and the gradation of image data.

As shown in FIG. 18, in the region g of the planar display face 10 of the display element 1, a corrected gradation 33 (70 gradation value in this example) may be inputted to the pixel 30g in the region g in the input to the display element 1 rather than an uncorrected gradation 32 (for example 100 gradation value) so as to obtain a luminance approximately 0.7 times that of the original image data for the region f even in case the original image data in the region g has the same gradation as in the region f. With this approach, the luminance of the region g of the planar display face 10 is approximately 0.7 times that of the region f. As a result, the luminance of the region G of the nonplanar display face 20 in the direction of the normal Zg may be set to almost the same as that of the region F in the direction of the normal Zf (100 gradation value in this example).

To be more precise, optical losses due to the optical element 5 and angle distribution of the outgoing light depend on the configuration of the optical element 5. Thus, it is desirable to correct the gradation of image data to be inputted to the pixel 30g in the region g while considering optical losses due to the optical element 5 and angle distribution of the outgoing light as well.

The angle distribution of outgoing light changes and the luminance in each region of the nonplanar display face 20 changes with the diffusion power of the diffusing member 22 arranged on the nonplanar display face 20. It is further desirable to correct the gradation of image data to be inputted to the pixel 30g in the region g while considering the change in the luminance by the diffusion power of the diffusing member 22 as well.

Embodiment 6

Figure 19:
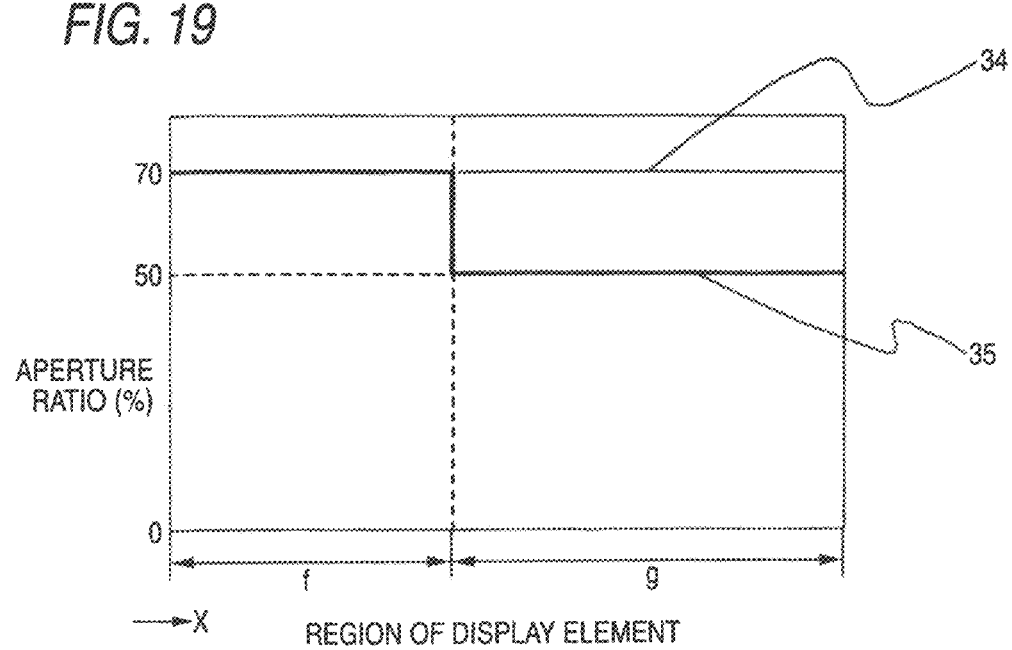
FIG. 19 shows the region of the display element of the liquid crystal display device according to Embodiment 6 of the invention and an aperture ratio of the pixel.

FIG. 19 shows an aperture ratio (ratio of the area of a transmitting part to the area of each pixel) by region of the liquid crystal display element of a display device according to Embodiment 6 of the invention. While the gradation of image data to be inputted to the pixel 30g in the region g of the planar display face 10 of the display element 1 is corrected in Embodiment 5, the display element 1 is a liquid crystal display element in Embodiment 6. As shown in FIG. 19, the aperture ratio of the pixel 30g in the region g of the planar display face 10 may be changed in accordance with the ratio of the area of the pixel 30g to the area of the corresponding pixel 40g in the region G of the nonplanar display face 20 viewed from a direction of observation.

For example, in the case of the configuration shown in FIG. 13 according to Embodiment 3, the aperture ratio of the pixel 30g in the region g of the planar display face 10 is set to a corrected aperture ratio 35 that is approximately 0.7 times (50% in this example) the same uncorrected aperture ratio 34 (for example 70%) as the aperture ratio of the pixel 30f so as to obtain almost the same luminance in case image data has the same gradation in each region of the nonplanar display face 20. With this configuration, the luminance of the pixel 30g in the region g of the planar display face 10 becomes approximately 0.7 times that of the region f in proportion to the aperture ratio without correcting the gradation of the image data before it is inputted to the display element 1. In this way, even when the aperture ratio of the pixel 30g in the region g of the planar display face 10 is changed in accordance with the angle θ formed by the planar display face 10 and the nonplanar display face 20, it is possible to display image data of the same gradation at almost the same luminance from each direction of observation in each region of the nonplanar display face 20.

In case the display element 1 is a self luminous type element such as an EL, the ratio of the area of the light-emitting portion to the area of each pixel may be changed as in the case of the aperture ratio of a liquid crystal display element to correct the light-emitting luminance of the pixel 30g. This approach makes it possible to display image data of the same gradation at almost the same luminance from each direction of observation in each region of the nonplanar display face 20 without correcting the gradation of the image data before it is inputted to the display element 1.

Embodiment 7

Figure 20:
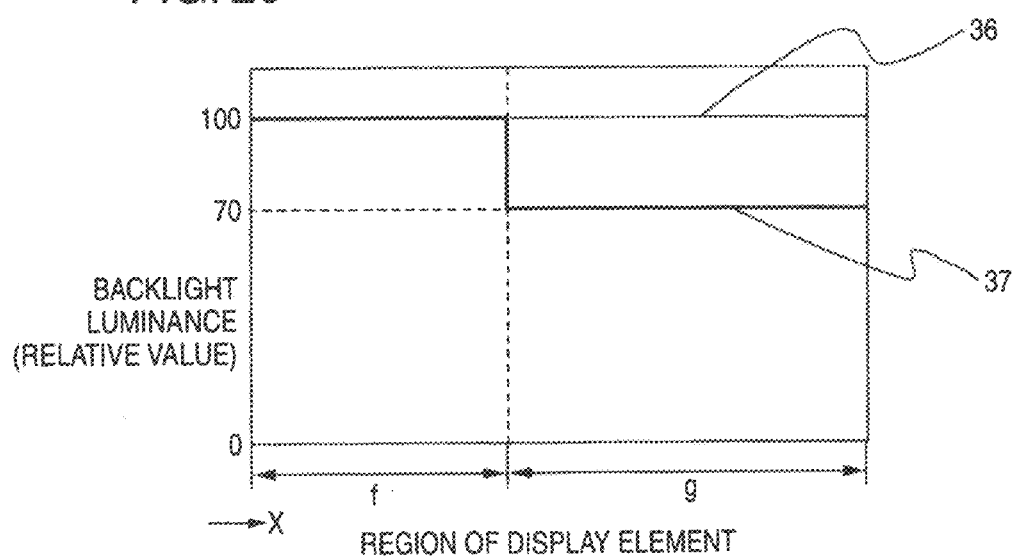
FIG. 20 shows the region of the display element of the liquid crystal display device according to Embodiment 7 of the invention and the backlight luminance.

FIG. 20 shows the luminance of a backlight by region of the liquid crystal display element of a display device according to Embodiment 7 of the invention. In Embodiment 7, the display element 1 is a liquid crystal display element and the aperture ratio of the pixel 30f is the same as that of the pixel 30g. In this example, a backlight 3 does not have uniform luminance. The luminance of the backlight 3 positioned in the region g is varied based on the ratio of the area of the pixel 30g to the area of the corresponding pixel 40g viewed from a direction of observation depending on the angle θ formed by the region g of the planar display face 10 and the corresponding region G of the nonplanar display face 20. In this way, corrected luminance distribution of the backlight 3 is employed rather than uniform luminance distribution. This makes it possible to display image data of the same gradation at almost the same luminance from each direction of observation in each region of the nonplanar display face 20 without correcting the gradation of the image data before it is inputted to the display element 1 or without changing the aperture ratio of the pixel 30g of the liquid crystal display panel 2.

For example, in the case of the configuration shown in FIG. 13 according to Embodiment 3, as shown in FIG. 20, the luminance of the backlight 3 positioned in the region g is set to a luminance value different from the uncorrected luminance 36 equal to that of the region f and the corrected luminance 37 is specified based on the ratio of the area of the pixel 30g to the area of the corresponding pixel 40g viewed from a direction of observation. In this example, the corrected luminance 37 of the backlight 3 positioned in the region g is approximately 0.7 times the uncorrected luminance 36.

In case the backlight 3 is a light guide plate type, the luminance distribution of the backlight 3 may be corrected by adjusting the density of an optical diffusion part on the light guide plate or a prism pitch on the light guide plate. In case the backlight 3 is a direct type, the luminance distribution of the backlight 3 may be corrected by adjusting the density of the arrangement of light sources such as a lamp and a Light Emitting Diode (LED). It is possible to correct the luminance distribution of the backlight 3 by adjusting the electric power inputted to the light source of the backlight 3 positioned in the region g.

Embodiment 8

Figure 21:
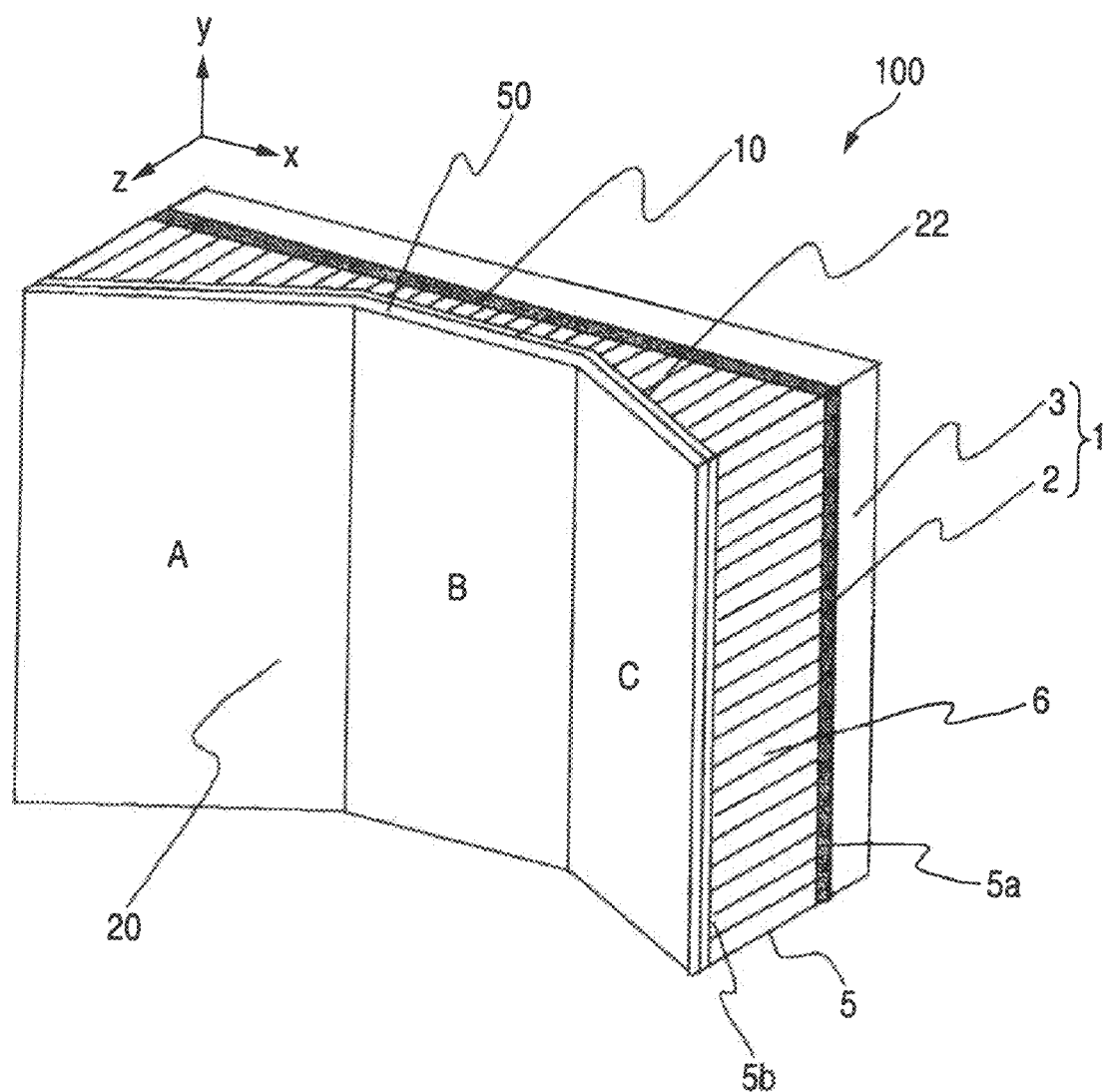
FIG. 21 is a perspective view of the general configuration of a liquid crystal display device according to Embodiment 8 of the invention.

FIG. 21 is a perspective view of the general configuration of a display device according to Embodiment 8 of the invention. In Embodiment 8, the nonplanar display face 20 according to Embodiment 1 includes input means composed of a touch panel 50 of the resistive film type, capacitance type, ultrasonic type, or optical sensor type arranged thereon. While the touch panel 50 is arranged on all regions along the nonplanar display face 20, the touch panel 50 may be arranged only in a partial region of the nonplanar display face 20 depending on a particular application.

The touch panel 50 is arranged on the display device 100. This eliminates the need for arranging switches as input means in a separate position from the display device 100, which is excellent in terms of space saving. The shapes and layout of switches may be displayed arbitrarily on the nonplanar display face 20 by way of image data. This provides a display device 100 including an input/output type nonplanar display face 20 that is excellent in terms of design or operability.

Embodiment 9

Figure 22:
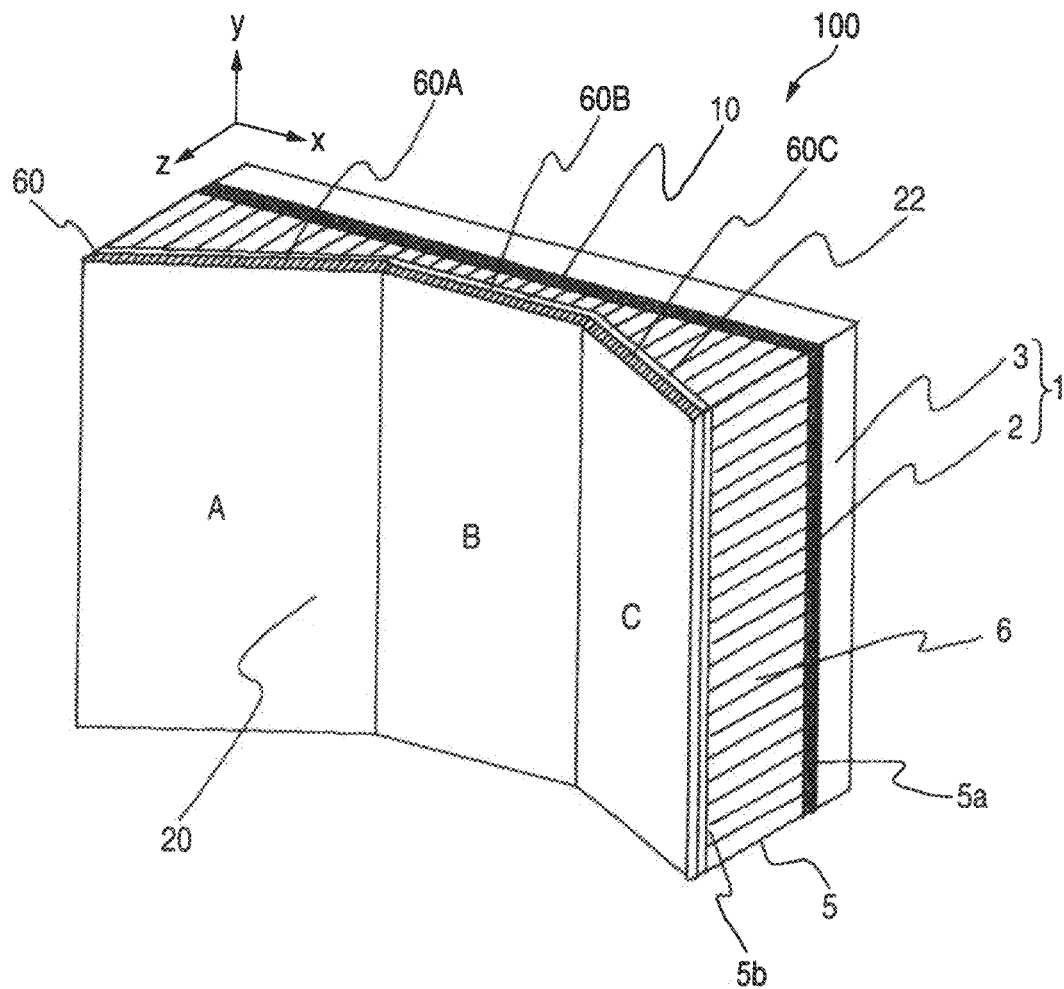
FIG. 22 is a perspective view of the general configuration of a liquid crystal display device according to Embodiment 9 of the invention.
Figure 23:
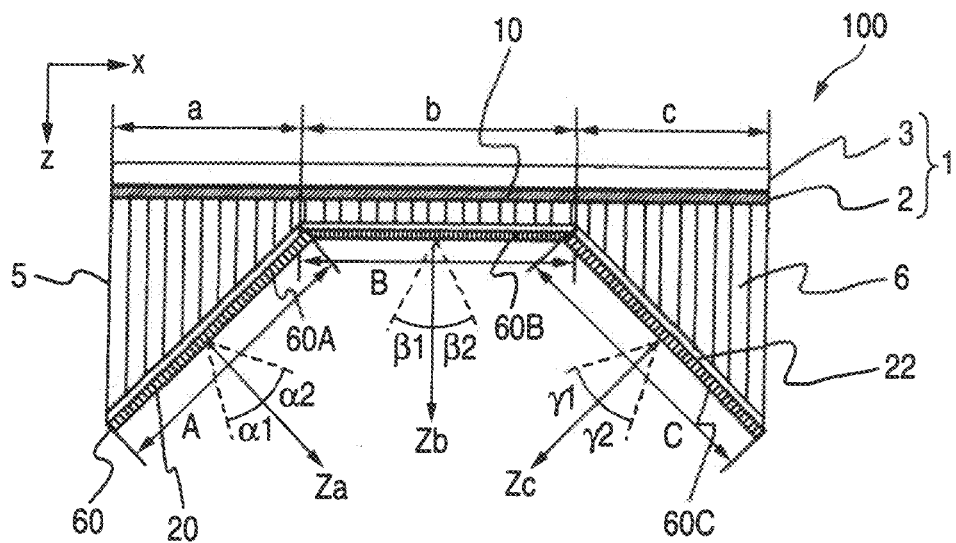
FIG. 23 is a top view of the display device according to Embodiment 9 of the invention.

FIG. 22 is a perspective view of the general configuration of a display device according to Embodiment 9 of the invention. FIG. 23 is a top view of the display device shown in FIG. 22. In Embodiment 9, the nonplanar display face 20 according to Embodiment 1 includes, on the front surface thereof, viewing angle control means composed of a viewing angle control film 60 for limiting the range of viewing angles at which the observer is able to watch a display.

While the viewing angle control films 60A, 60B, 60C are arranged on all of the three regions A, B, C along the nonplanar display face 20 in this example, the viewing angle control film 60 may be arranged only on a partial region of the nonplanar display face 20 depending on a particular application.

By arranging a viewing angle control film 60 on the display device 100, it is possible to hide an image in a particular region of the nonplanar display face 20 from a direction of observation where the image looks appreciably distorted. Or, it is possible to hide an image in a region of the nonplanar display face 20 the observer need not watch.

For example, a viewing angle control film 60A is arranged on the region A of the nonplanar display face 20. Through the viewing angle control film 60A, the observer is able to watch the display in the region A from a direction within the range of viewing angles between an angle α1 counterclockwise and an angle α2 clockwise as predetermined viewing angles with respect to a direction of observation Za where an image is almost free from distortions. The observer cannot watch the display in the region A from a right/left direction having a wider viewing angle. The angle α1 or α2 is typically 30°.

Similarly, viewing angle control films 60B, 60C are arranged on the regions B, C of the nonplanar display face 20. The observer is able to watch the display in the region B from a direction within the range of viewing angles between an angle β1 counterclockwise and an angle β2 clockwise as predetermined viewing angles with respect to a direction of observation Zb where an image is almost free from distortions. The observer is able to watch the display in the region C from a direction within the range of viewing angles between an angle γ1 counterclockwise and an angle γ2 clockwise as predetermined viewing angles with respect to a direction of observation Zc where an image is almost free from distortions.

While all angles α1, α2, β2, β2, γ1 and γ2 are the same and 30° in this example, these angles may be specified in accordance with a particular application and may differ from each other.

As described above, arrangement of the viewing angle control film 60 allows the observer in the direction of Za to watch an image only in the region A of the nonplanar display face 20 almost free from distortions and hides an image in the region B or C from the observer.

Examples of the viewing angle control film 60 include the Light Control Film from 3M and Lumisty Film from Sumitomo Chemical Co, Ltd. The Light Control Film including a light-absorbing louver (about 10 μm thick) made of transparent cellulose and carbon added thereto with a predetermined pitch (for example about 100 μm) transmits light in a direction within a predetermined range of viewing angles while it absorbs and blackens light in a direction of a larger viewing angle with the louver. The range of viewing angles may be controlled with the thickness of the Light Control Film and the angle of the louver with respect to the film surface. For example, for a symmetrical range of viewing angles, the louver is arranged at an angle perpendicular to the film surface. The Light Control Film is also advantageous in absorbing extraneous light from unwanted directions with a louver to prevent unwanted reflection such as reflection of an image onto the nonplanar display face 20.

The Lumisty Film transmits light in a direction within a predetermined range of viewing angles but scatters light where the refractive index changes between numerous layers of the Lumisty Film in directions of other viewing angles, causing white turbidity in the film and turning the film opaque. The white turbidity hides an image almost completely. The Lumisty Film has a layer structure formed by mixing two types of acrylic photo-setting resin having different refractive indices with each other and performing photo-setting using a special method. The direction of the layer may be formed at an arbitrary angle. The film in the direction along the layer is transparent. The Lumisty Film may be used as a diffusing member 22 for expanding the viewing only in a predetermined direction as long as the white turbidity (scattering of light) is small enough.

As a viewing angle control film 60, a capillary plate having a small thickness as an assembly of capillaries 7 used in Embodiment 4 may be used. In case the capillary plate is used as viewing control means, the dimension (pitch) of the capillary 7 need not be set below the dimension of the pixel 30 of the planar display face 10 or the dimension of the pixel 40 of the nonplanar display face 20 but may be set to a larger dimension.

Similarly, for the viewing angle control film 60 such as the Light Control Film or Lumisty Film, the dimension (pitch) between louvers and between portions of different refractive indices need not be set below the dimension of the pixel 40 of the nonplanar display face 20 but may be set to a larger dimension.

While the viewing angle control film 60 for controlling the viewing angles in the right/left direction of the nonplanar display face 20 has been described, it is possible to control a viewing angle in the up/down direction of the nonplanar display face 20 as well by using a similar method.

In Embodiments 1 to 9, the pixel 30 is a basic unit of composing a color in the case of a color display and is generally composed of three sub-pixels RGB (Red, Green, Blue). The dimensions of the pixel 30 should be changed in this basic unit composing the colors and the dimensions of the three sub-pixels in each pixel 30 are the same. This is because, for a nonplanar display face 20, in case the angle θ formed between the nonplanar display face 20 and the planar display face 10 gradually changes, the display color gradually changes when dimensions are changed in units of sub-pixels.

In Embodiments 1 to 9, a direction of observation where an image is almost free from distortions has been described as a direction of the normal in each region of the nonplanar display face 20. Depending on the display device 100, there are numerous directions of normals as in the case of a nonplanar display face 20 or a plurality of regions of the nonplanar display face 20 are used as a single direction of observation where an image is almost free from distortions. Depending on a particular application, a direction of observation where an image is almost free from distortions is not a direction of the normal in each region of the nonplanar display face 20. In this case also, different dimensions of the pixel 30 of the planar display face 10 may be set so as to minimize distortions in an image in a region of the nonplanar display face 20 to be observed from a predetermined direction of observation.

While the nonplanar display face 20 is not parallel to the horizontal direction x of the planar display face 10 in Embodiments 1 to 9, the nonplanar display face 20 may be not parallel to the vertical direction y of the planar display face 10. The shape of the nonplanar display face 20 may be such that the nonplanar display face 20 is in a direction different from the horizontal direction x or vertical direction y of the planar display face 10 (for example a semi-sphere) and the dimension Px of the pixel 30 in the horizontal direction x may be different from the dimension Py of the pixel 30 in the vertical direction y.

What is claimed is:

1. A display device comprising:
   a display element having a planar display face on which a plurality of pixels are arranged in a matrix shape; and
   an optical element that is arranged in close contact with or in close proximity to at least a partial region of the planar display face and optically transmits incoming image light, emitted by the pixels, from the planar display face to a light-emitting face of the optical element,
   wherein the light-emitting face of the optical element includes a surface not parallel to at least the planar display face and forms at least part of a nonplanar display face on the side of an observer, and
   wherein the plurality of pixels on the planar display face of the display element have different dimensions in accordance with the angle formed by the planar display face and the nonparallel surface of the nonplanar display face.

2. The display device according to claim 1,
   wherein the nonplanar display face comprises a plurality of regions,
   wherein the regions each have a direction of observation where an image is almost free from distortions, and
   wherein the nonplanar display face has a plurality of directions of observation where the images are almost free from distortions.

3. The display device according to claim 1, wherein the optical element is an assembly of numerous optical transmission paths whose cross-sectional dimensions are less than lateral dimensions of pixels of the planar display face of the display element.

4. The display device according to claim 3, wherein the optical element comprises an optical fiber plate as an assembly of optical fibers.

5. The display device according to claim 3, wherein the optical element comprises a capillary plate as an assembly of capillaries each having a cavity structure.

6. The display device according to claim 1, comprising:
   a diffusing member for diffusing light is arranged on the nonplanar display face.

7. The display device according to claim 1, wherein the luminance of a pixel of the planar display face is made different so as to obtain almost the same luminance of the nonplanar display face for the same gradation of original image data depending on the ratio of the area of the pixel of the planar display face of the display element to the area of the corresponding pixel of the nonplanar display face viewed from a direction of observation.

8. The display device according to claim 7, wherein the different luminance of a pixel of the planar display face is obtained by converting the gradation of the original image data to a different gradation before the data is inputted to the display element.

9. The display device according to claim 7,
   wherein the display element comprises a liquid crystal display element, and
   wherein the different luminance of a pixel of the planar display face is obtained by setting a different aperture ratio to the pixel of the planar display face.

10. The display device according to claim 7,
    wherein the display element is composed of a liquid crystal display element, and
    wherein the different luminance of a pixel of the planar display face is obtained by setting a different luminance to the backlight corresponding to the position of the pixel of the planar display face.

11. The display device according to claim 1, wherein input means is arranged at least on part of the nonplanar display face, and wherein the input means comprises a touch panel.

12. The display device according to claim 1, wherein at least a part of the nonplanar display face comprises viewing angle control means composed of a viewing angle control film for limiting the range of viewing angles at which an observer is able to watch a display.

* * * * *